C. G. HARRIS, DEC'D.
A. F. HARRIS, ADMINISTRATOR.
SHEET FEED OR SEPARATOR.
APPLICATION FILED FEB. 19, 1910.
1,112,609.
Patented Oct. 6, 1914.
16 SHEETS—SHEET 12.
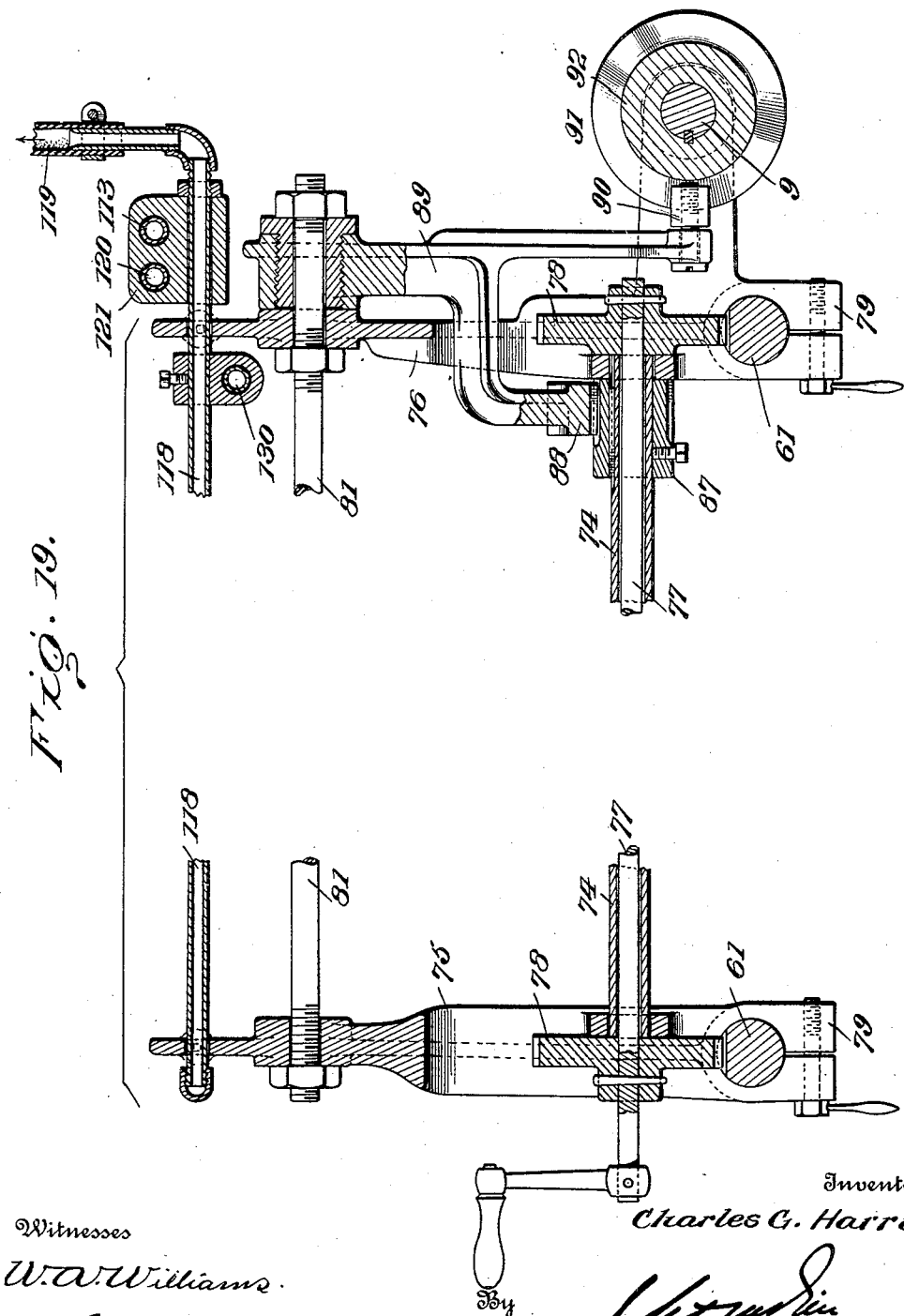
Witnesses
W. A. Williams
F. L. Maguire
Inventor
Charles G. Harris.
By
Attorney

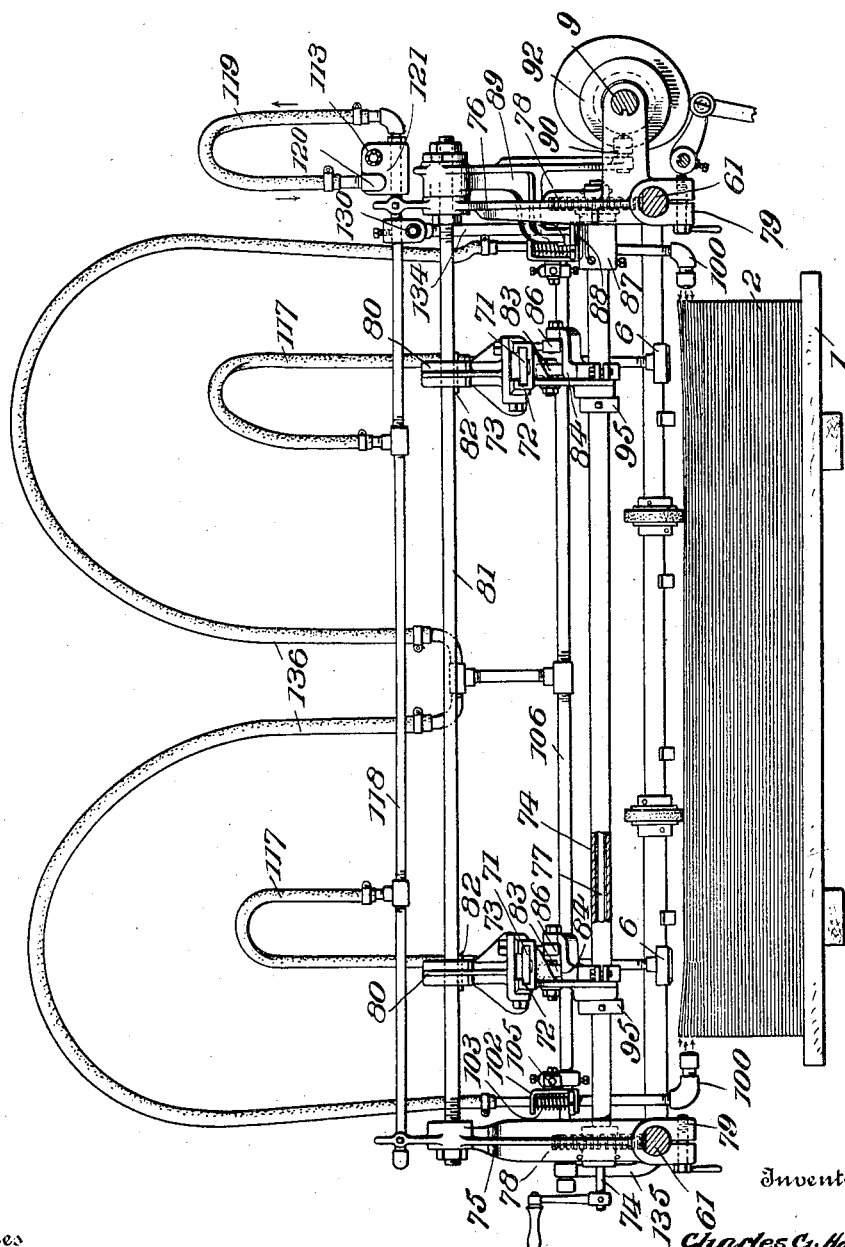

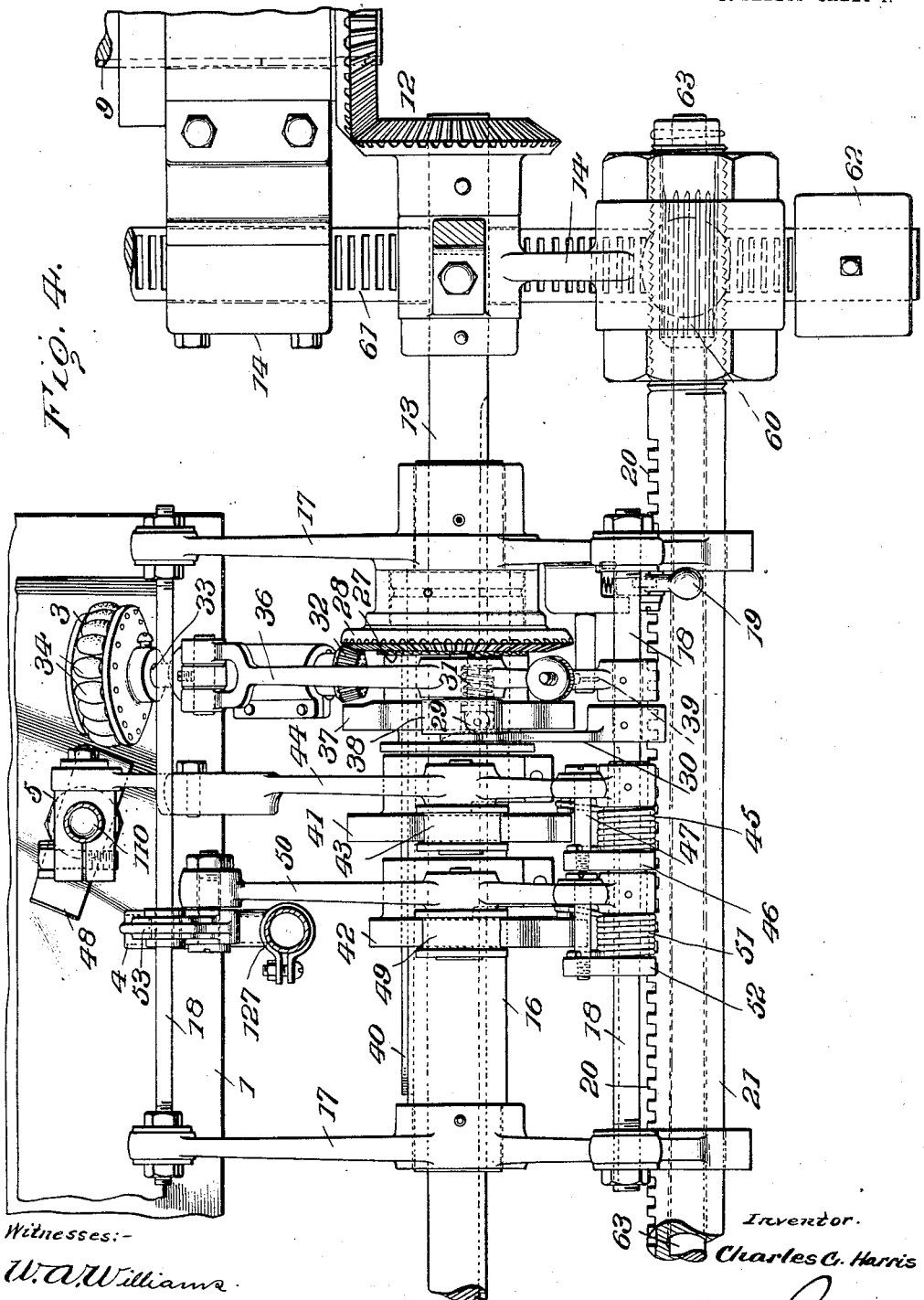

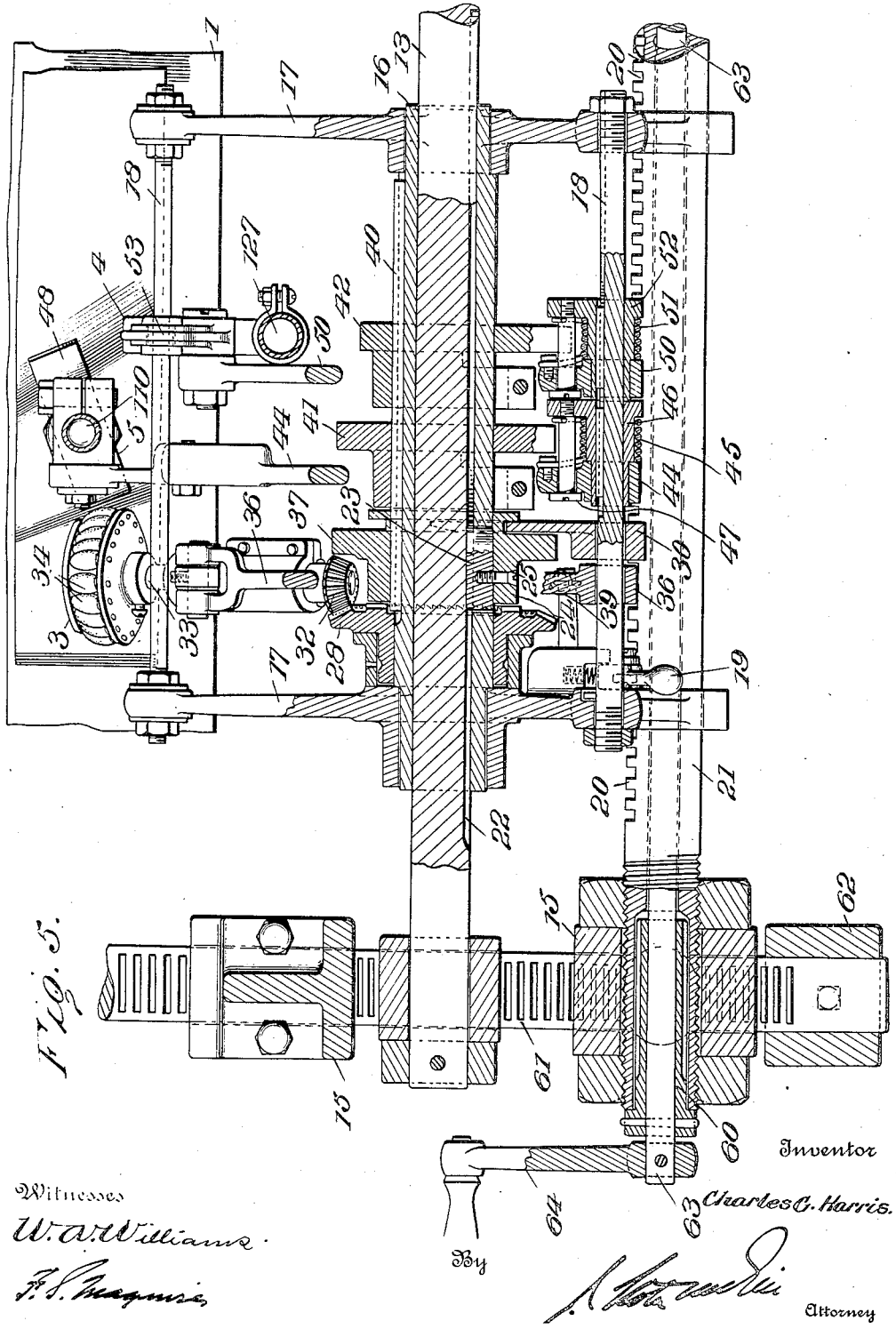

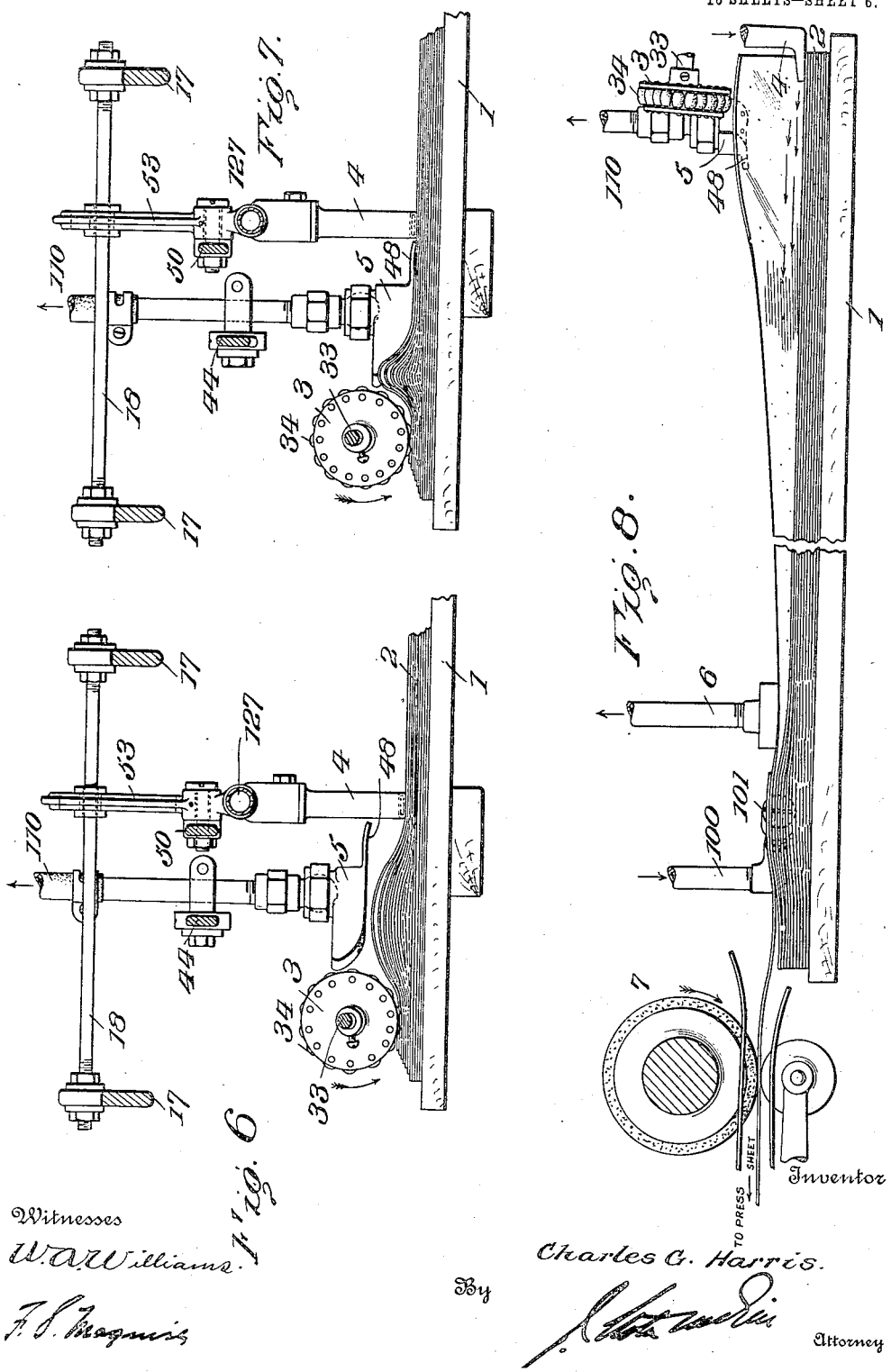

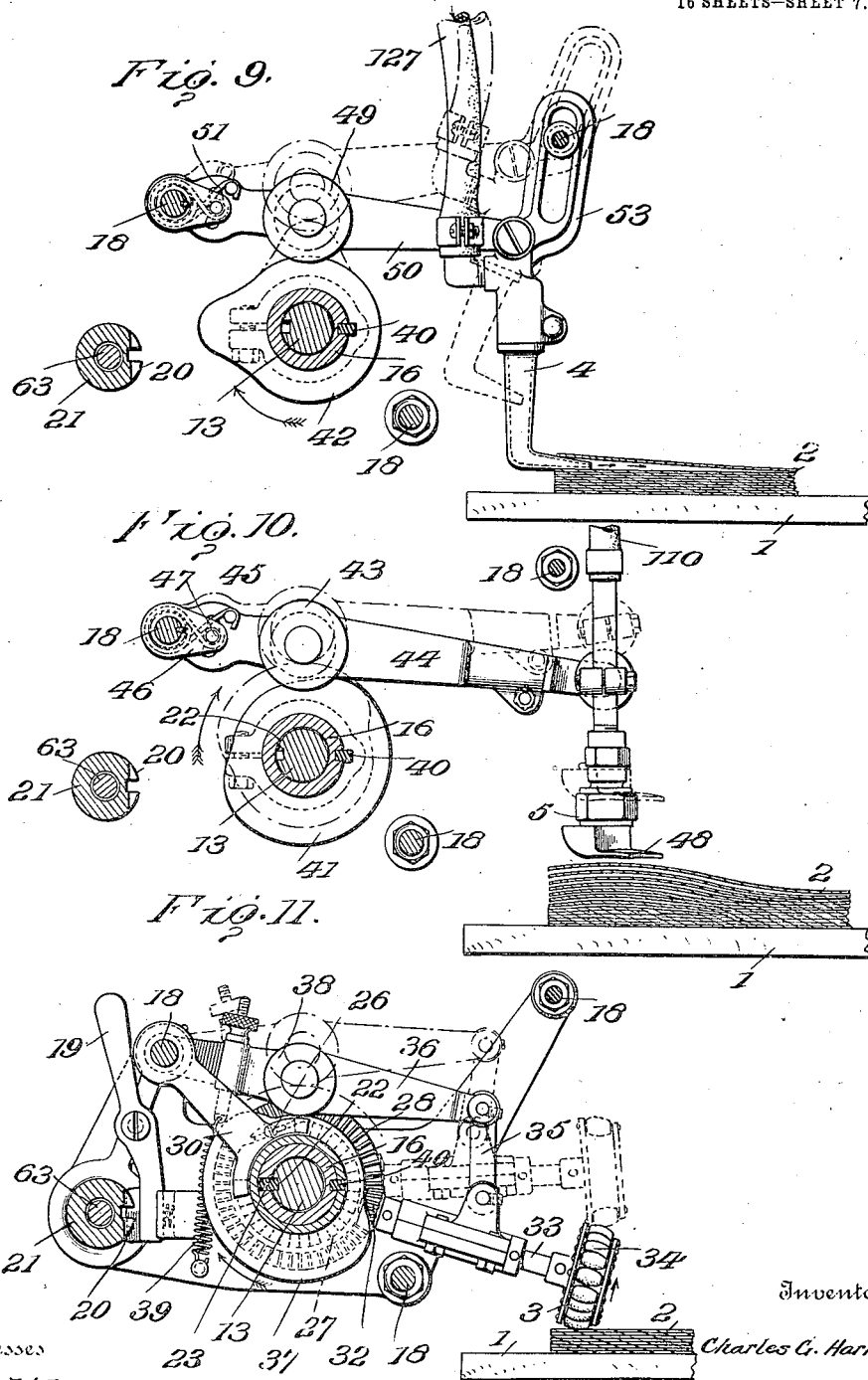

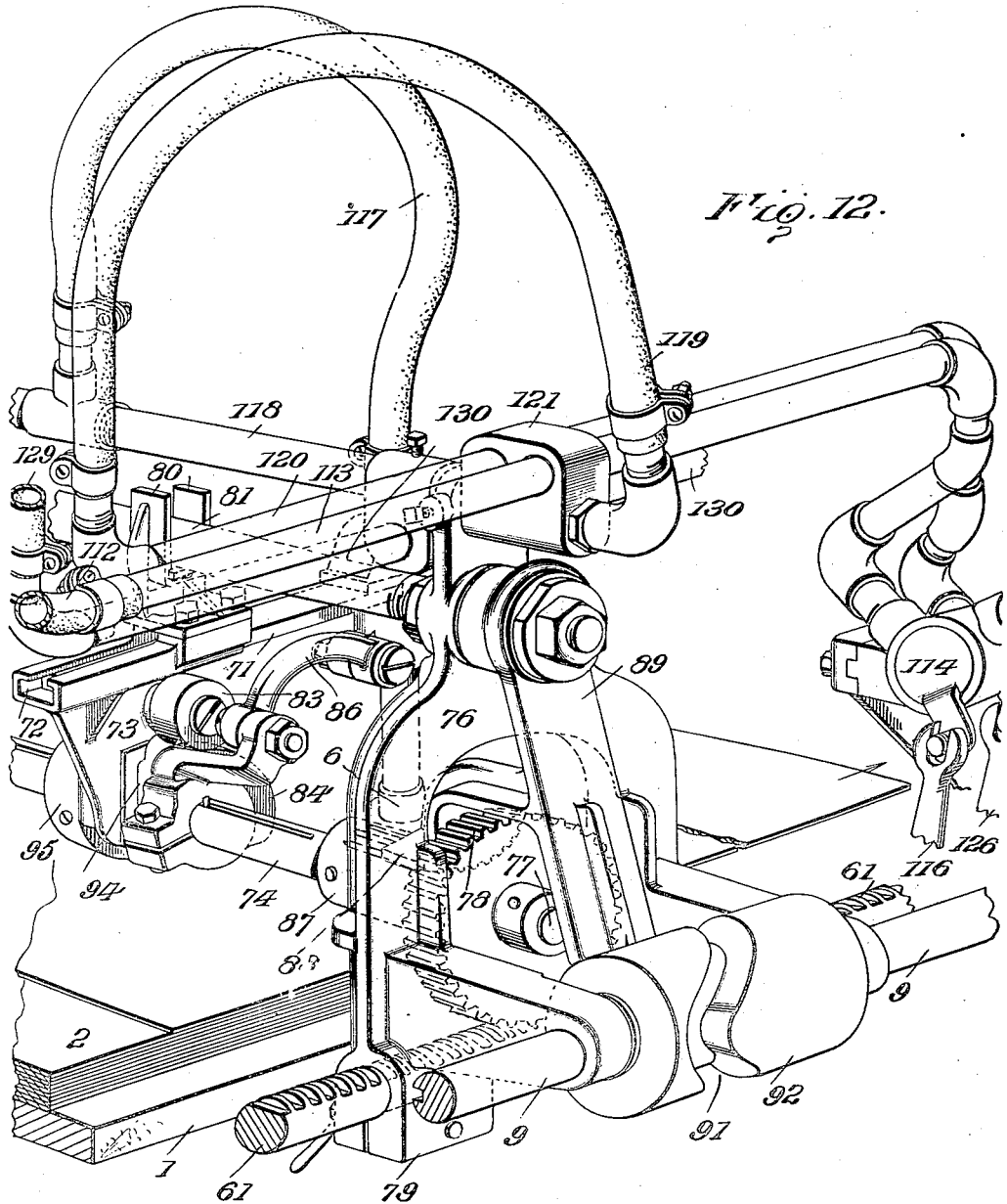

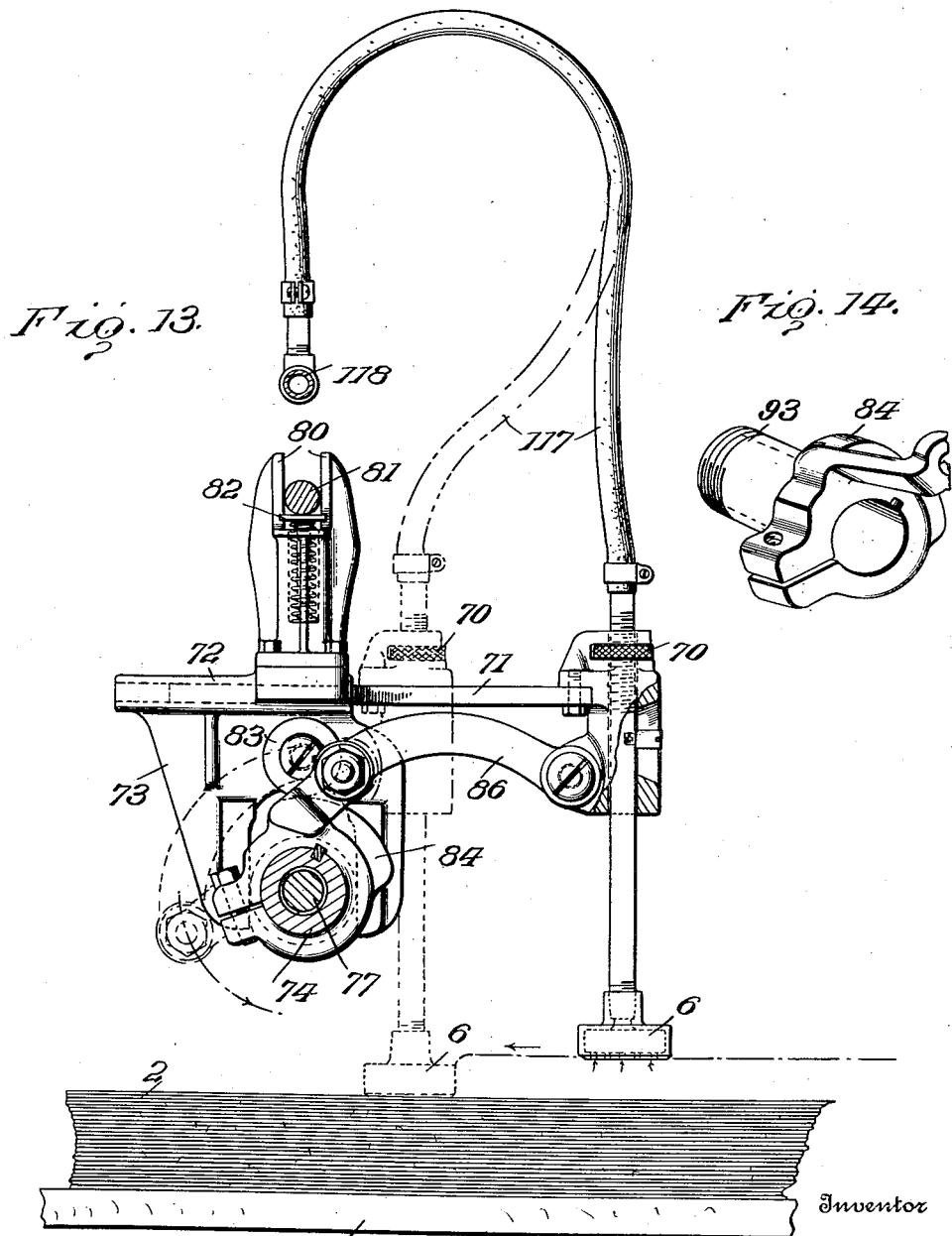

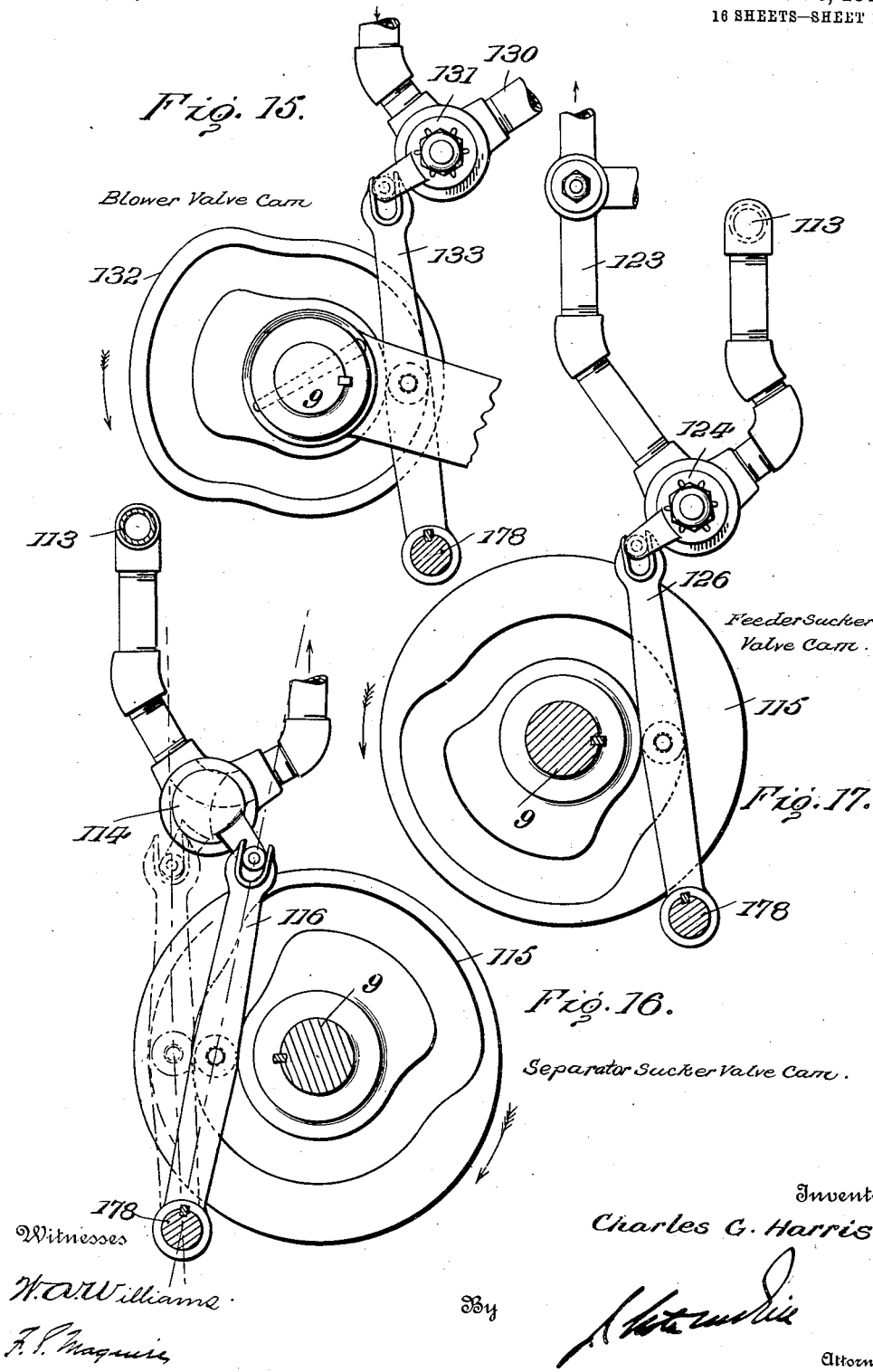

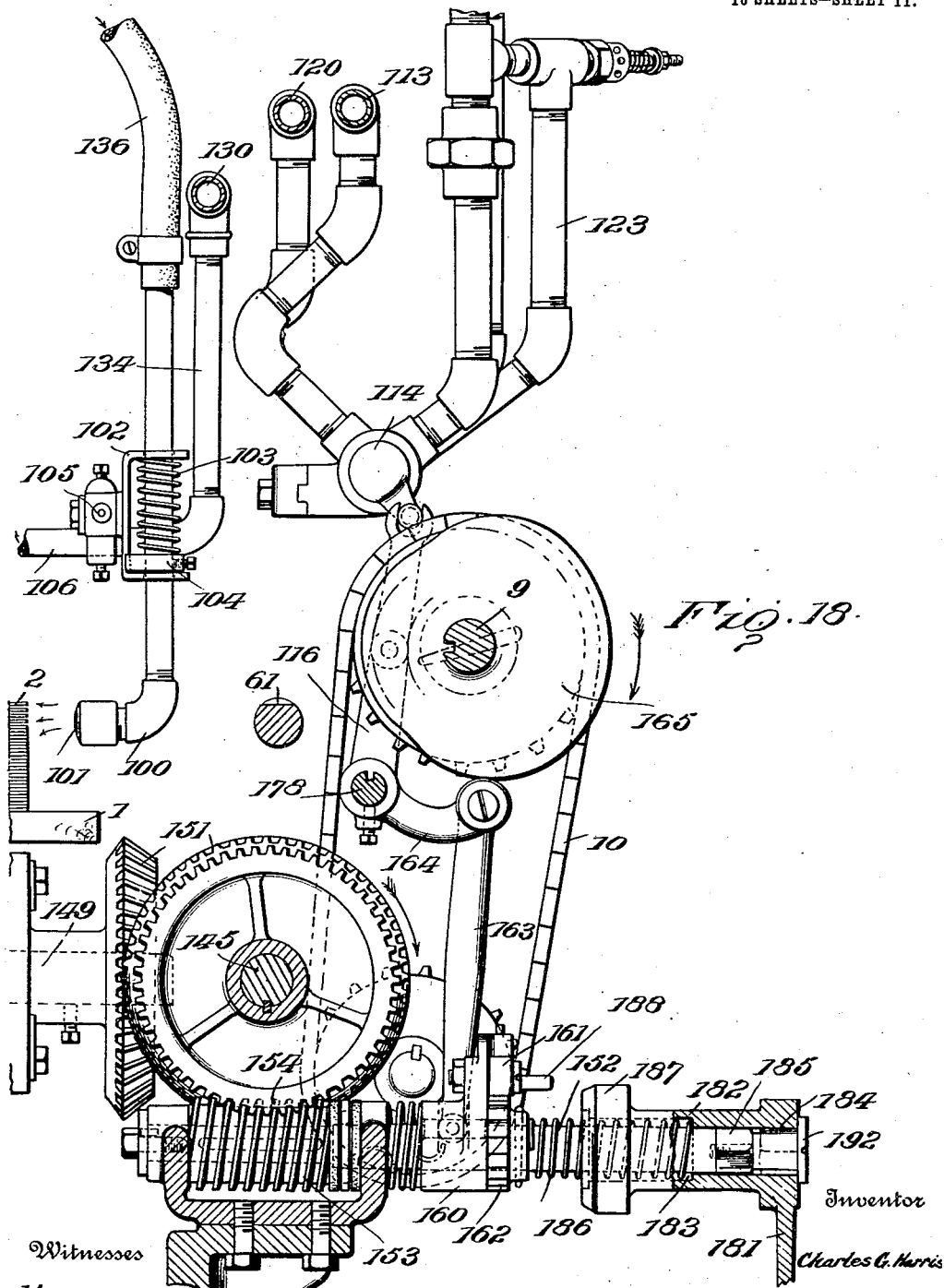

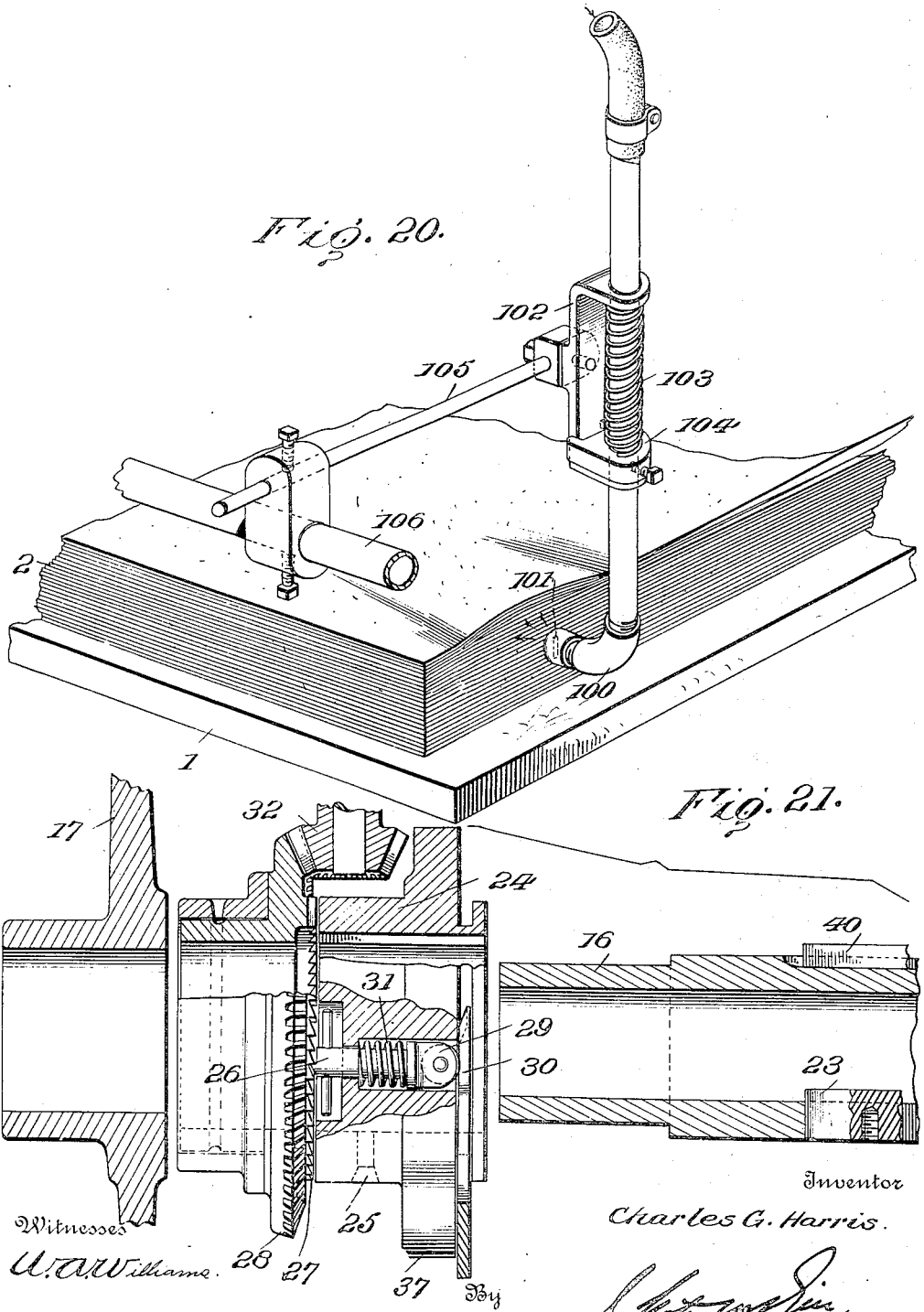

C. G. HARRIS, DEC'D.
A. F. HARRIS, ADMINISTRATOR.
SHEET FEED OR SEPARATOR.
APPLICATION FILED FEB. 19, 1910.
1,112,609.
Patented Oct. 6, 1914.
16 SHEETS—SHEET 14.
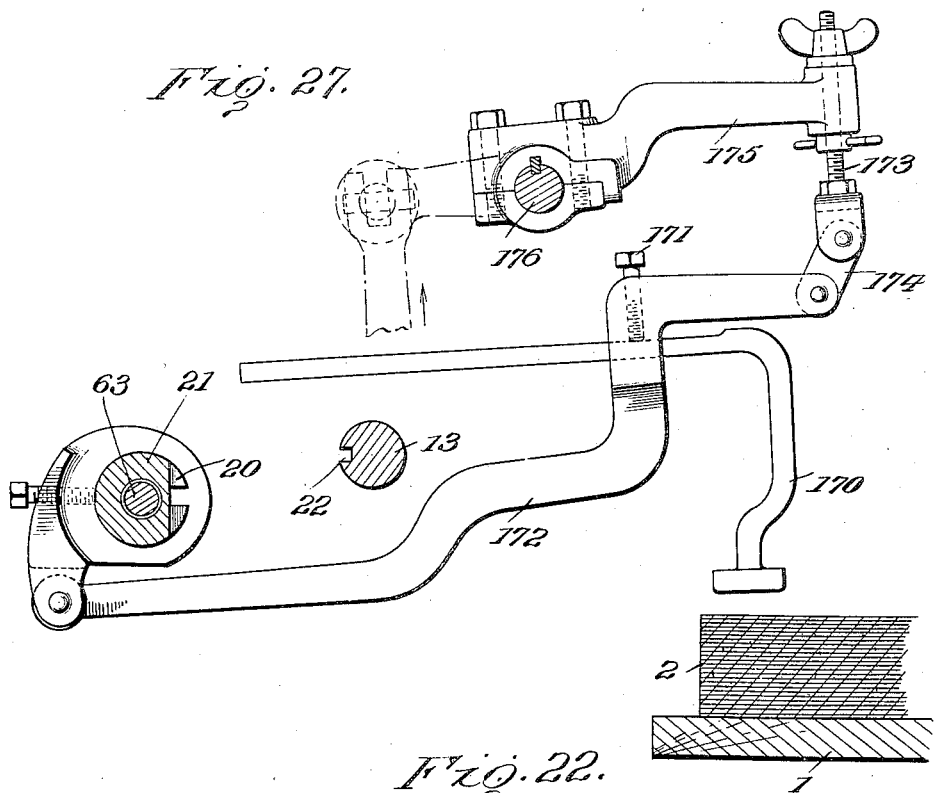
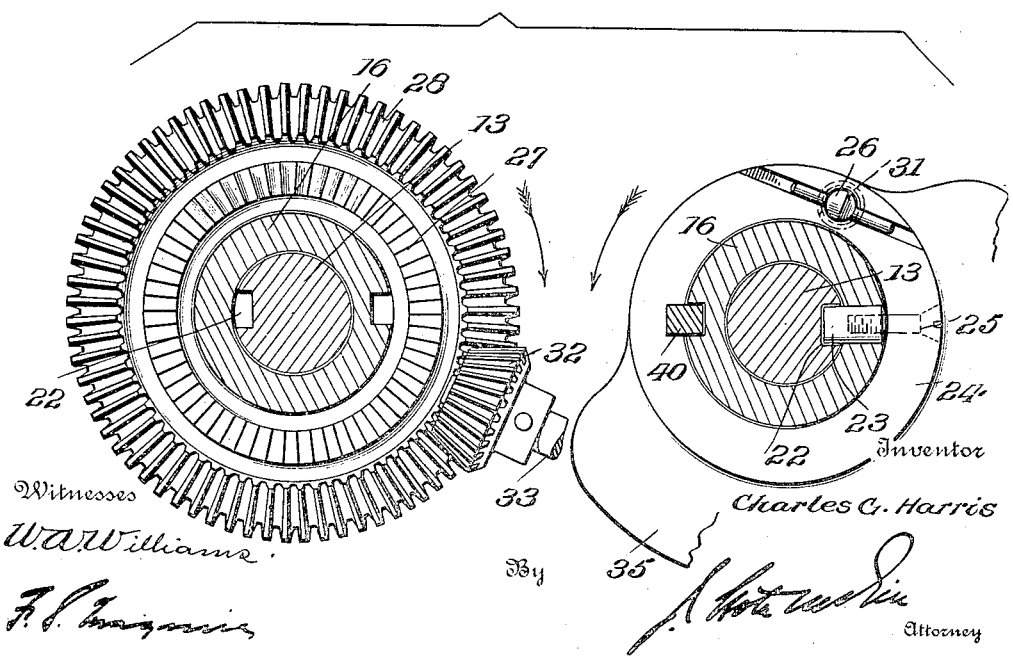

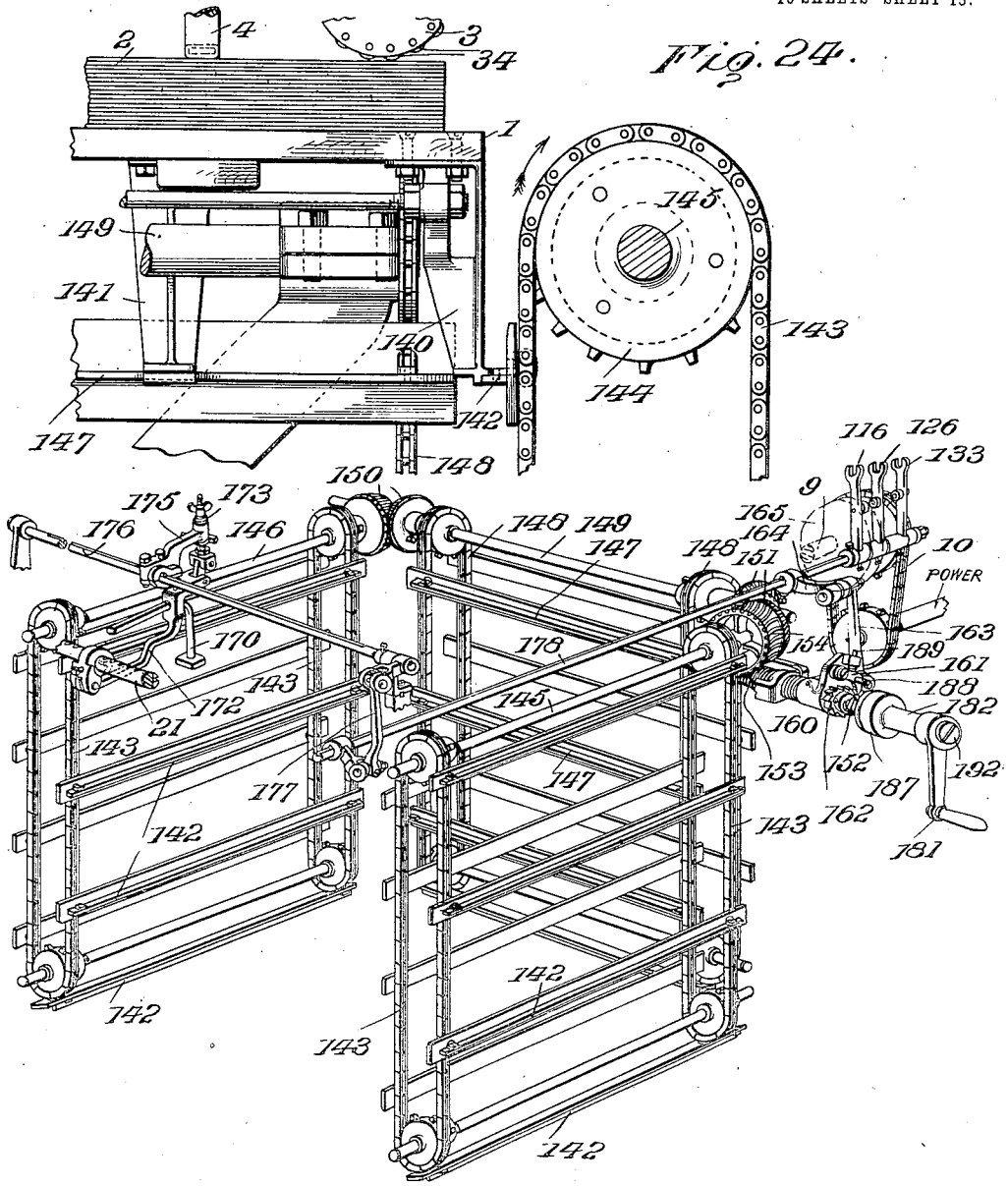

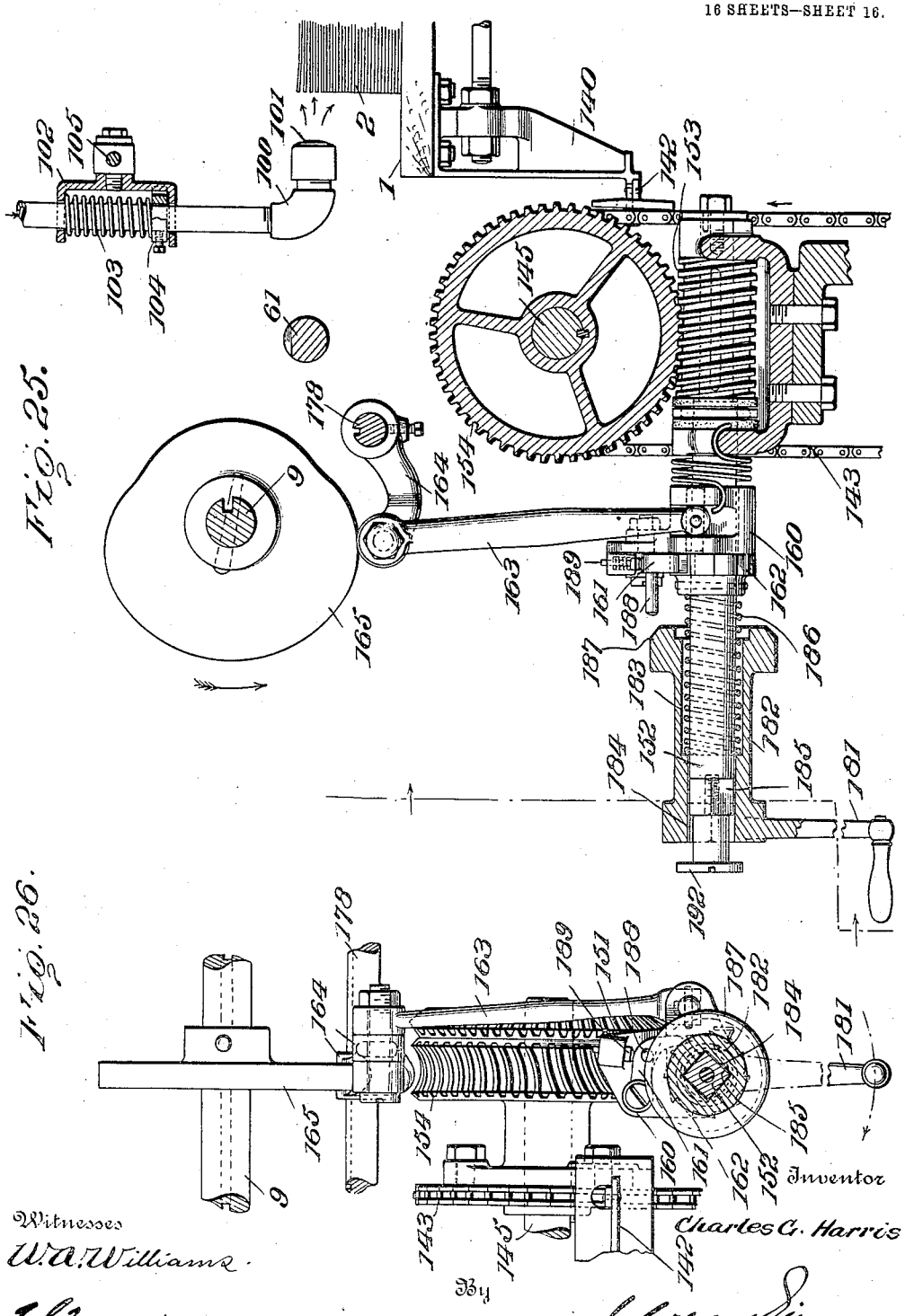

UNITED STATES PATENT OFFICE.

CHARLES G. HARRIS, OF NILES, OHIO; ALFRED F. HARRIS, ADMINISTRATOR OF SAID CHARLES G. HARRIS, DECEASED, ASSIGNOR TO THE HARRIS AUTOMATIC PRESS COMPANY, OF NILES, OHIO, A CORPORATION OF OHIO.

SHEET FEED OR SEPARATOR.

1,112,609.  Specification of Letters Patent.  Patented Oct. 6, 1914.

Application filed February 19, 1910. Serial No. 544,753.

*To all whom it may concern:*

Be it known that I, CHARLES GRANT HARRIS, of Niles, in the county of Trumbull and State of Ohio, have invented certain new and useful Improvements in Sheet Feeds or Separators; and I do hereby declare the following to be a full, clear, and exact description of the invention, such as will enable others skilled in the art to which it appertains to make and use the same.

The primary object of this invention is to provide a sheet feed or separator which will be capable of being operated at a high rate of speed, and which will, with equal facility, handle stock of varying degrees of thickness.

A further object is to provide improved means for insuring the separation of only a single sheet at each operation regardless of the speed of the machine or the character of the stock.

A further object is to provide means for buckling the stock prior to the separation of the sheet to be fed which will apply sufficient pressure to insure the separation of sheets whose edges have been caused to adhere from cutting the pile.

A further object is to provide means for buckling the stock prior to the separation of each sheet from the pile in such manner as to reduce to a minimum the amount of relative, sliding movement of the buckled sheets so that freshly printed stock may be re-fed without smearing.

A further object is to enable the parts to be readily and easily adjusted to piles of different proportions without danger of disarrangement. And a further object is to prevent the stock from being over-buckled, and likewise to guard against its being accidentally stripped from the suction separators.

The invention will be hereinafter fully set forth and particularly pointed out in the claims.

Figure 1:
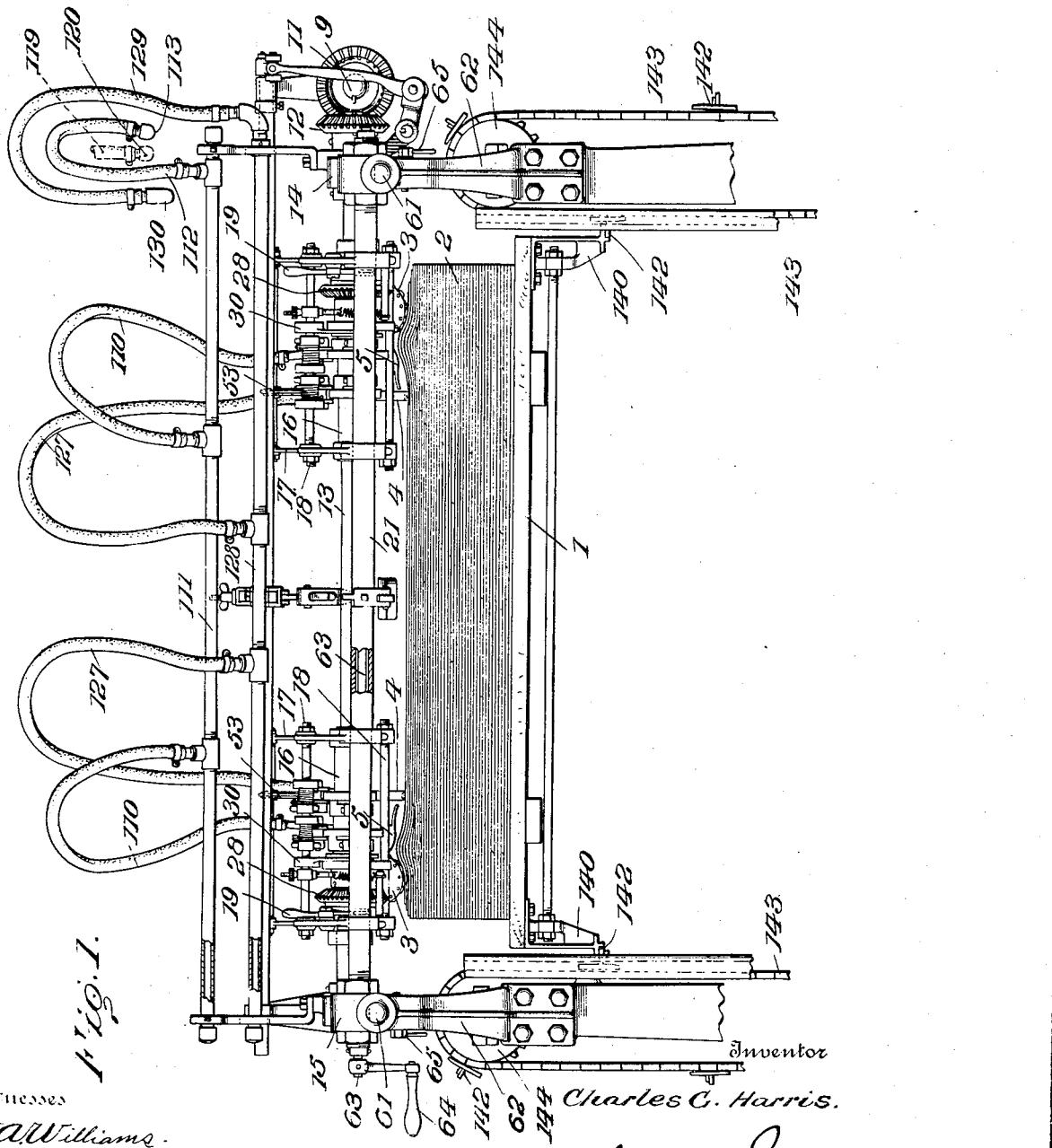
Figure 2:
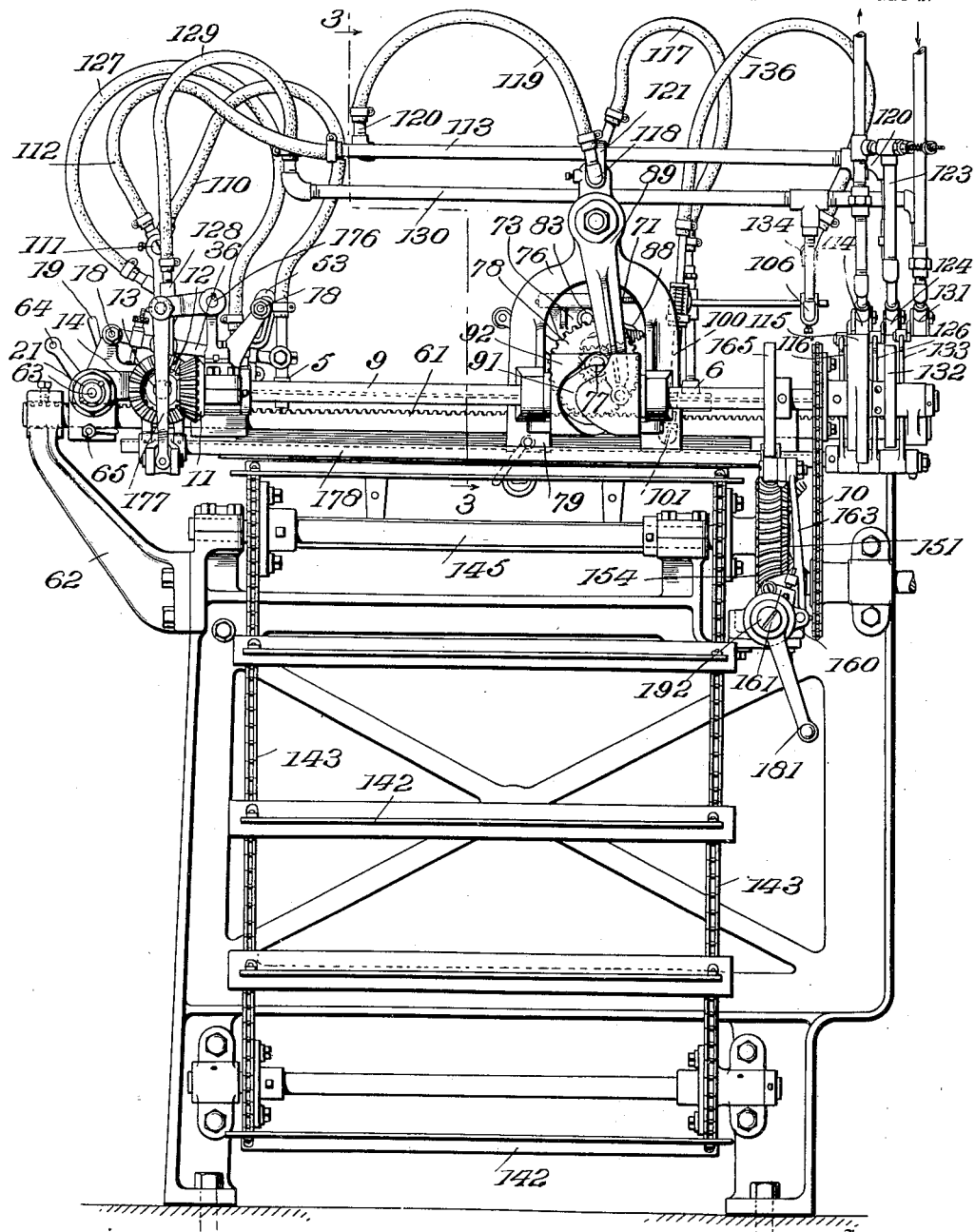

In the accompanying drawings, Figure 1 is a front view with parts omitted. Fig. 2 is a side elevation, at the right hand side of Fig. 1. Fig. 3 is a cross sectional view on line 3—3, Fig 2, looking in the direction of the arrows. Fig. 4 is an enlarged plan view of the buckling and separating mechanism and adjoining parts at the right hand side of the machine. Fig. 5 is a similar view, partly in section, of corresponding mechanism at the left hand end of the machine. Fig. 6 shows the positions of the parts after the topmost sheets have been buckled. Fig. 7 shows the buckled portion of the stock crowded laterally by a suction separator. Fig. 8 shows, in side elevation, the position of the parts after the topmost sheet has been raised from the pile and is engaged by a suction carrier. Fig. 9 is a side elevation, partly in section, of one of the presser feet, its raised position being indicated in dotted lines. Fig. 10 is a similar view of a suction separator. Fig. 11 shows one of the bucklers in the position it occupies when being actuated to buckle the sheet. Fig. 12 is a view in perspective, on an enlarged scale, showing the mechanism for operating one of the suction carriers and adjoining parts. Fig. 13 is a side elevation of one of the suction carriers, its lowered position being indicated in dotted lines. Fig. 14 is a view in perspective of the cam by which a suction carrier is raised. Figs. 15, 16 and 17 are enlarged views of the mechanism for operating the valves of the suction and blower pipes. Fig. 18 is an enlarged view showing portions of the pile raising mechanism, the valve mechanism and pipes, and a side blower. Fig. 19 shows in vertical section the means for adjusting the positions of the suction carriers and their operating mechanism longitudinally of the machine. Fig. 20 is a view in perspective, with parts broken away, showing one of the side blowers. Fig. 21 is an enlarged sectional view of the operating mechanism of a buckler, parts being separated. Fig. 22 shows the buckler clutch mechanism. Fig. 23 is a view in perspective of the raising mechanism. Fig 24 is an enlarged fragmentary view of portions of the raising mechanism and feed table. Fig. 25 is an enlarged view, partly in section, of the operating means for the table-raising mechanism. Fig. 26 is a front view of the raising mechanism shown in Fig. 25. Fig. 27 is an enlarged view of the feeler by which the automatic actuation of the feed table is controlled.

Referring to the drawings, 1 designates a table upon which the stock is piled, as indicated at 2, the table being periodically raised automatically as sheets are fed from the pile.

The means for separating the sheets of stock, and lifting only the topmost sheet from the pile, comprises two rotary bucklers 3; two presser feet 4 which are designed to bear against the top of the pile, at short distances inwardly from the bucklers, and two suction separators 5 which are designed to be lowered against the raised or buckled portions of the stock and crowd the same laterally so as to increase the spaces between the upper sheets and cause the top sheet to conform to the curved faces of the separators and extend over the suction openings therein. The bucklers are then raised out of engagement with the stock; then the presser-feet are thrown upwardly and rearwardly, and the suction separators are raised to remove the sheet from the pile, the rise of the separators being first slow and then accelerated. Thereupon the presser-feet are caused to again engage the pile by entering beneath the top sheet, and as this occurs blasts of air are ejected from the forwardly projecting ends of such feet beneath the raised sheet throughout its length. Simultaneously with this ejection of air at the rear end of the pile, air is also ejected from blowers at the sides of the pile, near the forward end thereof, to further aid in separating the sheets. Two suction carriers 6 are lowered into engagement with the pile at points within the range of the side blasts and are then elevated and moved horizontally forward to present the forward edge of the sheet to withdrawal rolls 7 (see Fig. 8) by which the several sheets are successively fed to the press, or other machine, and by the time the suction carriers are returned to their rearmost positions and again lowered to take up the next succeeding sheet the rear edge of the first sheet will have passed beyond the vertical plane of the suction carriers.

*Buckling and separating means.*—I will first describe the mechanism for actuating the bucklers, the presser feet and the separators. According to the arrangement shown in the drawings, the main operating shaft 9 is located at the right of the machine, and is driven by a chain 10 to which power may be transmitted from any suitable source. Shaft 9 at its rear end, through beveled gear wheels 11 and 12, drives a second shaft 13 which extends across the machine at the rear, said shaft 13 having its bearings in frames 14, 15, which are movable longitudinally of the machine. The gear 12 is fast to shaft 13, but the gear 11 is slidably keyed on shaft 9 and its hub is rotatably mounted in a lateral extension of frame 14. Hence as frames 14, 15, are moved longitudinally of the machine the gear 11 will slide on shaft 9 while maintaining its engagement with gear 12. In consequence, in adjusting the position of shaft 13 the connection with the power shaft remains unaltered. The shaft 13 actuates the buckling and separating mechanism. Inasmuch as these parts are duplicated at opposite sides of the machine, the description of one series will apply to both. On shaft 13, near each end, is a hollow spindle 16 the ends of which project through two corresponding end-pieces 17 which are united by tie rods 18, said end pieces 17, tie rods 18 and spindle 16 constituting a frame which may be adjusted transversely of the machine, and held locked at any desired point by a spring-pressed pawl 19 engaging rack teeth 20 of a tubular cross-rod 21 mounted at its ends in frames 14, 15. In shaft 13 is a longitudinally extending spline 22 (see Figs. 4, 5) into which projects a key 23 secured in clutch head 24 by a screw 25. This clutch head 24 carries a dog 26 (see Figs. 21 and 22) which is designed to be forced into engagement with a circular ratchet 27 on the face of a beveled gear-wheel 28 to effect the rotation of the latter. This gear-wheel 28 is loose on spindle 16, and the dog is forced to engage the ratchet when its roller 29 encounters a fixed cam 30 suspended from the upper rear tie-rod 18. When the roller is free of the cam the dog is disengaged from ratchet 27 by a spring 31. In this way the beveled gear-wheel 28 is intermittently rotated, and through beveled pinion 32 (see Fig. 11) on the upper end of buckler-shaft 33 the buckler 3 is intermittently rotated, such rotation being coincident with or subsequent to its engagement with the pile of stock.

Each buckler is designed to produce a series of traveling arcs or buckles in the topmost sheet or sheets of a pile of stock, and the stock being held against movement in proximity to the buckling means by the presser-feet 4, the series of traveling arcs or buckles is accumulated in a larger arc or buckle. To enable the bucklers to comb the stock to produce the plurality of successive buckling impulses to a sheet or sheets and thereby form the traveling arcs or buckles, a series of circularly arranged rollers 34 are located around the periphery of each buckler, such rollers being axially mounted between two disks fitted to the free end of shaft 33.

The buckler-rollers may be made of any suitable material, and each roller being axially revoluble a firm frictional engagement is had with the stock, and as the bucklers are rotated their rollers acting successively and progressingly will comb or buckle the stock, against the resistance of the presser-feet 4, to produce a series of traveling arcs in the top-most sheet or sheets, such series of traveling arcs or buckles being accumulated in a larger arc or buckle with air spaces between the sheets. It is immaterial how many sheets are buckled in each operation, that it to say, there may be but one or a plurality of sheets buckled by the combing action of the bucklers. The bucklers are comparatively narrow at their peripheries, since it is only necessary that they have a limited engagement with the stock, and this engagement is preferably close to the edge transversely of the machine and near the corners. The bucklers are shown as being set transversely of the pile. The bearing for shaft 33 is connected by a link 35 to the forward end of a lever 36 which is hung at its rear end on the upper rear tie-rod 18. (See Fig. 11.) The clutch-head 24 carries a cam 37 for engaging a roller 38 of lever 36 to effect the raising thereof, the lowering of the buckler into engagement with the pile being effected by a spring 39 connected to lever 36. On its exterior the spindle 16 has a spline 40 (see Figs. 4 and 5) extending practically the full length thereof. Adjacent to clutch-head 24 is a cam 41, and next to this is another cam 42, both of which are held to spindle 16 by spline 40 so that they may be readily adjusted longitudinally of the latter. Cam 41 coöperates with a roller 43 mounted on the side of a lever 44 (see Figs. 4 and 10) by which a suction separator 5 may be raised, such separator being normally held downward by a spring 45 acting on the fulcrumed end of lever 44, said spring encircling a sleeve 46 secured to lever 44 by a screw 47, said sleeve projecting through the opening in the lever. This sleeve 46 is held on the upper rear tie rod 18 by a spline and key which permit lever 44 to be adjusted along the tie rod by merely sliding its pivoted end on the latter.

The cams 41 are so formed as to impart to the separators first a slow movement, as it begins to rise, and then a gradually accelerated motion. This is for the purpose of aiding in avoiding more than one sheet at a time being taken up by the separators. When a machine is operating at a high speed, say about 6,000 sheets per hour, there is danger, if the separators are too quickly operated, that is, before the buckled portion of the stock is crowded laterally, of taking up more than one sheet, but I avoid this difficulty by imparting to the separators first a slow movement and then a gradually accelerated motion at a sufficiently increased speed to off-set the delay occasioned by the initial slow movement.

Each suction separator 5 is in the form of a hollow casing on the lower end of a tube, and from one end of this casing projects a tail piece 48, and at its other end the casing has an upwardly curved face wherein are formed suction openings. As shown in Figs. 4 and 5 the separators are movable on planes transversely to the bulged or raised portion of the stock formed by buckling. The center of the engagement of a separator with the buckled stock is usually to one side of the apex of the raised portion, and preferably nearer the presser foot than the rotary buckler. In consequence, as the separator descends the bulged or raised portion is crowded laterally, and the stock being held both by the buckler and the presser foot the spaces between the topmost sheets will, in the more condensed mass, become concentrated at the center thereof, and the top sheet will necessarily be forced to conform to the curved face of the separator. The result is that as soon as suction is created the top sheet alone will adhere to the separator, and be caused to rise therewith. The action will be the same even though there be but one sheet buckled in each operation, as occurs in handling extra heavy stock, such as cardboard.

The cam 42 engages a roller 49 (see Figs. 4 and 9) of a lever 50 by which a presser foot 4 is carried, and this lever is likewise normally held depressed by a spring 51 acting on the fulcrum end thereof, said spring encircling a sleeve 52 which is a duplicate of the sleeve 46, and, like the latter, is splined to tie-rod 18 so as to permit the lever to be adjusted longitudinally thereof. By the described construction the positions of the separator and presser foot relatively to each other or to the buckler may be readily adjusted by sliding cams 41 and 42 and levers 44 and 50 longitudinally of their supports. The presser foot 4 carries a link or a longitudinally slotted arm 53 through which the upper forward tie-rod 18 is passed so that when lever 50 is actuated the presser foot will have a swinging motion, being thrown rearwardly of the plane of the pile as it is elevated and then forwardly as it is lowered so that its forwardly projecting end may enter beneath the top or separated sheet. Each presser foot is of approximately L-shape in its lower portion and is made hollow with an outlet slot in its forward reduced end through which blasts of air are ejected beneath a raised sheet. This ejection of air occurs as the presser feet are lowered into engagement with the pile.

From what has been stated it will be observed that by simply disengaging pawls 19 from cross rod 21 the bucklers, the suction separators and the presser feet, may be shifted transversely of the machine to accommodate piles of different sizes or to adjust their positions relatively to the corner of a pile, and also that a relative adjustment may be readily effected between the presser feet and the separators, and also between the latter and the bucklers. In handling different grades of stock, the attainment of best results requires a relative adjustment between the presser feet and the bucklers, a greater separation being necessary with heavy than with light stock. This adjustment may be effected without losing the advantage of having the bucklers engage the sheets in close proximity to the corners where sep-
aration is more readily accomplished. The separators may also be adjusted to insure the lateral crowding of the bulged portions and the consequent increased space beneath the top sheet, making positive the taking up of only a single sheet at each operation.

To enable the buckling and separating mechanism to be adjusted longitudinally of the machine to accommodate stock of different sizes the frames 14 and 15 are capable of being moved back and forth, and for this purpose any suitable means may be employed. I have shown toothed sleeves 60 (Figs. 4 and 5) engaging racks formed on fixed rods 61 paralleling the sides of the machine and secured to the fixed frame thereof, the rear bearing for these rods being indicated at 62, Figs. 1 and 2. The toothed sleeves 60 are keyed on a rod 63 extending through rack rod 21 which lattter is formed with openings to permit the teeth of sleeves 60 to engage rack rods 61. This rod 63 has a crank handle 64 at one end. After the frames 14 and 15 have been adjusted by turning rod 63 they are preferably locked by handled bolts 65 projecting through split portions thereof as shown in Figs. 1 and 2.

*Sheet feeders.*—The suction carriers 6 have their tubular portions adjustably secured by nuts 70 (see Fig. 13) to the outer ends of horizontally disposed slides 71 which are movable in guideways 72 of a bracket 73 which fits loosely on a tubular shaft 74 extended transversely of the machine and mounted at its ends in side frames 75 and 76, which latter may be adjusted longitudinally of the main frame by turning a rod 77 passed through shaft 74 and carrying gear wheels 78 which mesh with the racks of rods 61. The frames may be held at any desired point by binding their split ends 79. The brackets 73 have upward extensions formed with opposite parallel members 80 which project on opposite sides of a tie-rod 81 carried by frames 75 and 76. Spring-pressed followers 82 by bearing against the undersides of tie-rods 81 tend to constantly depress brackets 73. The lowering of the brackets is permissible only when the laterally mounted rollers 83 thereof are disengaged by cams 84 adjustably splined on shaft 74. Cams 84 are connected by links 86 to the outer ends of slides 71, and by this connection the carriers 6 are given their horizontal motions. As they are lifted from the pile by the action of cam 84 the pull exerted on link 86, will, by the time the lifting is completed, effect the forward travel of the carriers by the movement of slides 71 in their guideways. By the time the stock is released by the carriers the rotation of shaft 74 and cam 84 is reversed and in consequence the carriers first move rearwardly on horizontal lines and then are lowered into engagement with the pile, such lowering occurring as cam 84 moves out of engagement with roller 83. The shaft 74 at one end carries a sleeve 87 having rack teeth with which engages a toothed sector 88 carried by an arm 89 pivotally hung from tie-rod 81 which connects frames 75 and 76. A branch of this arm 89 has a laterally projecting roller 90 which extends into the groove 91 of a cam 92 splined on the main operating shaft 9, and located between lateral projections 92' of frame 76. The cam groove is so formed as to give a quick movement to arm 89 at the end of the stroke, so that by the quick disengagement of cam 84 from roller 83 the suction carriers may be quickly lowered into engagement with the stock. Therefore, the raising and lowering of the carriers and the horizontal shifting thereof are effected by the reciprocation of shaft 74 through the actuation of arm 89 by cam 92. Each cam 84 is provided with a hub 93 which extends between opposite lower guideways 94 of brackets 73 and carries at its end a collar 95 so as to maintain a fixed relation between the cam and the carrier bracket. The cams 84 and their hubs being splined on shaft 74, the suction carriers may be adjusted laterally of the pile to suit piles of different widths, and the shaft 74 in turn may be adjusted longitudinally of the line of travel of the stock by simply turning the handle of rod 77.

For the purpose of aiding in separating the sheets, and to guard against the suction carriers 6 lifting more than a single sheet in each operation, I provide two blowers or ejectors 100 which are located on opposite sides of the pile near the forward end thereof and in close juxtaposition to the carriers. These ejectors are shown in the form of tubes over the ends of which are caps having vertically-disposed slots 101 through which the air is discharged at approximately right angles to the edges of the sheet. The tubes of these ejectors are passed through coincident openings in the upper and lower horizontally disposed branches of a U-shaped keeper 102, and each tube is surrounded by a spring 103 which acts upon a plate 104 adjustably secured to the tube and grooved at one end to engage the vertical wall of the keeper. By this construction, should the feed table come into contact with the blowers the latter may move upwardly without danger of being broken, but they are normally held in their proper positions by springs 103. The keepers 102 are adjustable horizontally, longitudinally of the line of feed, on rods 105, which in turn are mounted on a pipe 106 in a manner which will permit of adjustment transversely of the line of feed. In handling large stock additional forward blowers may be employed, and if located transversely of the line of feed they will be swung out of the way after ejecting air against the front edge of the pile.

*Pneumatic connections.*—The two separators 5 are connected by sections 110 of flexible hose with a pipe 111 extending transversely of the machine and mounted at its ends in the movable frames 14, 15, and this pipe at one end is connected by a flexible hose section 112 to a pipe 113 paralleling the side of the machine and fixedly supported at its forward end. This pipe 113 is connected to a suitable suction apparatus, not shown, and within such pipe is a valve 114 which is automatically operated by a cam 115 acting on a lever 116. The two carriers 6 are connected by two hose sections 117 to a pipe 118 which is supported at its ends by the movable side frames 75, 76, and at one end is connected by a hose section 119 to a pipe 120 which parallels the suction pipe 113. The pipe 118 carries a guide 121 (see Figs. 3 and 12) formed with openings to accommodate pipes 113 and 120 upon which it slides as frame 75 and 76 are adjusted back and forth. The pipe 120 is connected by a branch 123 to that portion of pipe 113 which leads from the suction apparatus, and in this pipe 123 is a valve 124 which is operated by cam 115 through a lever 126. Cam 115 has cam grooves in its opposite faces into which project friction rollers carried by the two levers 116 and 126. This cam 115 is located on the main operating shaft 9.

The presser feet 4 are connected by hose sections 127 to a pipe 128 which is beneath pipe 111 at the rear of the machine, and this pipe is also supported by extensions of the movable frames 14, 15. At one end pipe 128 is connected by a hose section 129 to a pipe 130 which parallels pipe 113 at the side of the machine. This pipe 130 leads from a suitable blower, not shown, and within this pipe 130 is a valve 131 which is operated by a second cam 132 located on shaft 9 adjacent to cam 115, said cam 132 acting on valve 131 through a lever 133. Pipe 130 has a depending branch 134 which opens into the pipe 106 extending transversely of the machine near the forward end thereof and supported at the opposite side by a bracket 135. At its center this pipe 106 has an upright branch which is connected by two hose sections 136 to the tubes of the side ejectors 100. By this arrangement when valve 131 is opened air is blown from the ends of the presser feet beneath the raised end of the topmost sheet which has been separated from the pile and is held by the suction action of the separators 5, and at the same time air is ejected from the side blowers 100 so that as the suction carriers are lowered into engagement with the top of the pile and are then elevated therefrom they will lift but a single sheet at a time. The arrangement of the cam grooves in the opposite faces of cam 115 is such that the suction through the separators 5 is broken in advance of breaking the suction in the carriers, to the end that the latter may convey the sheet forward to the withdrawal rolls after it has been released by the separators.

*Table raising mechanism.*—The support for the stock is shown as composed of a feed-board having depending brackets 140 at its opposite sides and brackets 141 at its forward end. In practice I usually provide two or more feed boards so that one may be positioned within the machine as soon as the supply of stock is exhausted from a previously located board. The depending brackets 140 rest upon corresponding bars 142 carried by endless chains 143 located at opposite sides of the machine. These chains at their upper ends engage sprocket wheels 144 on shafts 145 and 146, and likewise engage idler sprocket wheels at their lower ends. A second series of supporting bars 147 is carried by chains 148 which engage sprockets on a shaft 149 at right angles to shafts 145 and 146, said chains 148 also engaging idlers at the lower ends of their flights. The brackets 141 of the feed-boards rest upon the bars 147, and in this way additional support is had for such boards. The shaft 146 is driven by a shaft 149 through beveled gearing 150, and shaft 149 is in turn driven by shaft 145 through beveled gearing 151. The actuation of shaft 145 is effected by the rotation of a shaft 152 carrying a worm 153 which meshes with a worm wheel 154 keyed on shaft 145. The shaft 152 may be power actuated or operated manually or automatically. Loose on this shaft is a spring-impelled collar 160 which carries a pawl 161 which engages the ratchet 162 fast on shaft 152. This collar is turned against the tension of its spring by the downward movement of a link 163 which is connected to an arm 164 upon which a cam 165 on operating shaft 9 is designed to act. The depression of link 163 effects the turning of shaft 152 the extent of one notch of the ratchet, but the engagement of the pawl with another ratchet tooth is dependent upon the pawl-carrying collar 160 being sufficiently turned under the action of its spring to allow the pawl to ride into engagement with such second tooth. The action of the spring on collar 160 is regulated by the height of the pile of stock. For this purpose I employ a feeler 170 which is designed to engage the top of the pile, and as the height of the latter is gradually lowered by the successive withdrawal of sheets of stock therefrom the pawl-carrying collar will ultimately be permitted to turn sufficiently to allow the pawl to ride into engagement with a second tooth so that as such collar is turned by the downward movement of link 163 shaft 152 will be rotated the extent of one tooth of the ratchet, and through the engagement with shaft 145 such shaft together with the shafts 146 and 149 will be rotated a slight distance and thereby raise the pile of stock.

The feeler 170 (see Fig. 27) is shown in the form of a rod having a depending portion for engaging the top of the pile and an approximately horizontal portion which is detachably held by a screw 171 to a lever 172 fulcrumed at its rear end on cross rod 21. The forward end of lever 172 is adjustably connected by a screw 173 and a link 174 to an arm 175 keyed on a cross shaft 176 which extends transversely of the machine at the rear thereof, and this shaft in turn is connected by crank arms and link 177 to a rock shaft 178 upon which arm 164 is secured. Hence as cam 165 depresses link 163 and arm 164 shafts 178 and 176 are rocked and through arm 175 the feeler is raised from the pile. This occurs at the time the topmost sheet is taken up by the separators. So long as the stock remains at a practically uniform level the reciprocation of link 163 by cam 165 will not effect any change in position of the raising mechanism, but as soon as the level of the pile has lowered to an appreciable extent the increased downward movement of feeler 170 will permit the pawl to ride into the next following tooth of the ratchet. This operation is continued until all of the stock has been removed, whereupon a second board is positioned on the chains. The valve-actuating levers 116, 126 and 133 are mounted on shaft 178.

To enable the raising mechanism to be manipulated manually I provide a handle 181 which normally hangs loosely from shaft 152 and with which it is designed to interlock only when moved into position for that purpose, and which also, by a further movement, may automatically disengage the pawl from the ratchet to permit the shaft to be reversed to effect the lowering of the feed table. The handle has a sleeve 182 wherein is formed a circular bore 183 and a second bore 184 which is square in cross section. Shaft 152 also has a squared portion 185 with which the squared portion of the handle is designed to engage when the handle is moved inward longitudinally of its shaft, but at all other times the handle hangs loosely, the squared portion 184 being held out of engagement with the squared portion of the shaft by a spring 186 which encircles the shaft and is located within the circular bore of the handle. Therefore, when it is desired to effect the raising of a feed-table by manual means the operator must bear inwardly on the handle to overcome the tension of spring 186 and permit the squared portion 184 to engage squared portion 185 as shown in Figs. 25 and 26.

When it is desired to lower the feed table it is necessary to rotate shaft 152 in the reverse direction, and to do this pawl 161 must be disengaged from the ratchet. Hence I form the inner end of sleeve 182 with a circumferential enlargement 187, beveled along its edge, so that by moving the sleeve of the handle still farther longitudinally of shaft 152 said enlargement will engage a pin 188 of the pawl and lift the latter from the ratchet. After the table has been moved to the desired point a release of pressure on the handle will permit spring 186 to move the handle longitudinally of the shaft and allow the pawl to reëngage the ratchet under the action of a spring-pressed plunger 189 which is mounted on collar 160. As the sleeve is further moved outwardly on the shaft its squared portion 184 will be beyond the squared portion of the shaft, under the action of spring 186, and thereupon the handle will occupy an idle position without any tendency to turn shaft 152 as would be the case if the handle were constantly locked to the shaft. The outward movement of the handle under the action of spring 186 is limited by a stop 192 at the end of the shaft. No claim is made in this case to the table raising mechanism.

*The operation.*—Stock is placed on a feed-board or table 1 and the latter is positioned within the raising mechanism by locating its brackets on corresponding carrying bars of the several chains. The operator then raises the feed table by bearing inwardly on handle 181 to an extent sufficient to cause its squared portion 184 to engage the squared portion of shaft 152, and by turning the latter to the right power will be transmitted to shafts 145, 146 and 149. If it be necessary to lower the feed table in order to secure the required adjustment handle 181 is moved still farther inwardly to disengage pawl 161 from ratchet 162. The two frames carrying the bucklers, the separators, and the presser feet are then adjusted transversely of the pile in order to position the bucklers near the opposite rear corners thereof. This is effected by first disengaging pawls 19 from racks 20. If it be necessary to adjust the frames and the parts carried thereby in the line of travel of the stock handle 64 is turned the necessary extent. The positions of the suction carriers is regulated by releasing the clamped ends of side frames 75 and 76 and turning rod 77 so that said frames may be moved longitudinally of the side rods 61. Connections being made with the blower and suction apparatus the machine is ready for operation. Power is transmitted from any suitable source to the operating shaft 9 which in turn actuates shaft 13. The stock is buckled by combing from the opposite corners by the rotation of the rotary bucklers, the rotation thereof beginning with or immediately following their engagement with the stock, at which time the clutch dog 26 is forced into engagement with ratchet 27 by cam 30. As the stock is being buckled the presser feet are firmly in engagement with the top thereof short distances from the corners, and preferably transversely of the machine. It is preferred that the rotation of the bucklers be coincident with or subsequent to their engagement with the stock, since if they were rotating at the time of engagement, especially in handling very thin stock, the tendency might be to overbuckle, resulting in combing the edge of the topmost sheet beyond the bucklers. The successive and progressive combing raises or bulges the stock between the bucklers and the presser feet, as shown in Fig. 6, so as to loosen up the pile to the extent of twenty-five or more sheets, depending on the quality and condition of the stock. In handling extra heavy stock, such as cardboard, the bucklers may comb a buckle in only the topmost sheet. As before stated, it is immaterial whether the buckle be formed in one or a plurality of sheets. After the sheet or sheets have been raised or bulged the two suction separators 5 are lowered against the raised or bulged portion which is then crowded laterally by the separators toward the bucklers, thereby concentrating the air space beneath the topmost sheet at the apex of the bulge and increasing the distance at that point between it and the next lower sheet, thereby insuring contact of the top sheet with the curved face of each separator. Suction being created in both separators they will take hold of the top sheet and carry it with them as they are raised, the separators rising first slowly and then at a gradually accelerated speed. First, the bucklers are elevated to an extent to avoid the sheet engaging therewith, thereby preventing stripping. As the separators are rising, with the sheet adhering thereto, the presser feet are raised and swung rearwardly and then immediately lowered onto the pile beneath the raised sheet, their lower ends being projected forwardly as they are moved downwardly. Air is then ejected from the presser feet beneath the raised sheet, and simultaneously therewith air is blown against the sides of the pile near its forward end. At this time the two suction carriers 6 are lowered onto the top sheet within the zone of the side blasts. Suction being created in these carriers they take hold of the top sheet and are then raised on vertical lines, and then moved forward on horizontal lines, carrying the sheet to the withdrawal rolls 7. At the time the suction carriers start on their forward movement suction is broken in the separators and the blasts through the presser feet and side blowers are discontinued. By the time a sheet is carried to the withdrawal rolls the bucklers are again lowered onto the pile to comb a buckle in the top sheet or sheets as before, and the topmost sheet is raised by the separators, and by the time the suction carriers 6 are returned to their rearward positions and again lowered onto the pile the rear edge of the first sheet will have passed beyond the plane of these carriers. The speed at which sheets are withdrawn by the withdrawal rolls may be readily regulated to suit different sizes.

It will be noted that the separation between the buckled sheets is concentrated by the lateral crowding of the bulged portions by the separators. This insures the top sheet conforming to the curvature of the separator, with the result that as soon as suction is created by no possibility can the separators fail to take hold of the top sheet. Taking up more than one sheet is thus made impossible.

I have found that, in a machine of this character when operating at high speed, by imparting to the separators first a slow motion, as they are being raised from the pile, and then an accelerated motion, the danger of removing more than one sheet at a time is avoided, since it allows time for increasing the distance between the top sheet and the rest of the pile by the action of the separators in moving the bulged portion laterally. Likewise, there is a decided advantage in intermittently rotating the bucklers, that is to say, in postponing their rotation until they engage the stock or subsequently thereto.

When the rotary combing bucklers engage the pile, the feet 4 are bearing thereon at points near the bucklers, and preferably inwardly transversely of the machine, and as these feet are still in engagement with the pile when the bucklers are lifted, all the buckled sheets will return to their former positions on the pile, with the exception of the topmost sheet which will be held by the suction separators which are raised immediately after or as the feet are disengaged from the pile.

In all known separators and feeders of the buckler type it has been essential that only a single sheet be buckled in each operation, any greater number usually resulting in the feeding forward of a plurality of the buckled sheets. According to my invention it matters not whether the bucklers comb one or fifty sheets in each operation, since the topmost sheet will always be separated, at the point of buckling, from the next adjacent sheet. The space represented by this separation will be concentrated at the crest of the buckled portion by the lateral crowding of the suction separators, thus increasing the separation at the point where suction is applied.

Heretofore, under some circumstances, as where the pile has been but recently cut, and the sheets are massed or packed together at their edges, it has been practically impossible to separate the sheets automatically, one at a time, in those machines constructed to buckle only the top sheet, since if the pressure on the buckler is sufficient to separate the sheets at their edges, it will buckle more than one sheet at a time. These difficulties do not exist in the practice of my invention. It being immaterial how many sheets are buckled in each operation, the bucklers are always under sufficient pressure to insure the positive separation of the sheets at their edges.

The bucklers have comparatively narrow peripheries, and hence have but limited bearing on the stock, and in buckling, the edge of the stock is moved relatively to the bucklers, which will preferably engage the pile in close proximity to the transverse edge thereof and near the opposite corners. In feeders and separators as heretofore constructed it has not been practicable to automatically re-feed freshly-printed stock without smearing, which latter results from the rubbing of the buckled sheet which is ordinarily moved or pushed by the bucklers the distance of several inches over the next lower sheet, and this movement frequently extends within the printed field of the lower sheet. By my invention no difficulty is experienced in automatically re-feeding stock immediately after it has passed through a press, since a margin as small as one-half inch is sufficient for the rotary bucklers to act on the stock and for the retaining feet to hold it while the bucklers are in action and the separators are engaging the buckled portions. The combing bucklers do not travel bodily over or with the topmost sheet and hence the latter is not pushed, under frictional pressure, over the next lower sheet or sheets. The bucklers have no traveling movement with the sheets being buckled; they have only a rotary movement in a fixed plane and the peripheral rollers thereof act successively and progressively on the topmost sheet. The presser feet allow only that portion of the stock to be buckled which lies between them and the combing bucklers.

Although I have shown and described preferred means for carrying out the invention, yet I do not restrict myself thereto, since changes may be made without departing from the spirit of the invention. The machine is adaptable for separating and feeding sheets of stock of various sizes, grades and thicknesses. Its most distinctive feature lies in the fact that it may be operated at a high rate of speed regardless of the character of the stock.

I claim as my invention:—

1. In a sheet feed or separator, in combination, successive and progressingly acting means for combing a buckle in one or a plurality of sheets at the top of a pile of stock, means for engaging and holding the stock at a point near the engagement of the buckling means with the stock, such holding means preventing any portion of the stock from moving save the buckled portion, a separator located intermediate the buckling means and the holding means and designed to contact with the buckled portion of the stock while the buckling and holding means are in engagement therewith, and means for disengaging the buckling means from the stock, any buckled portion of the stock other than the top-most sheet being allowed to resume its previous position on the pile after the buckling means is disengaged therefrom.

2. In a sheet feed or separator, in combination, successive and progressingly acting means for combing a buckle in one or a plurality of sheets at the top of a pile of stock, means for engaging and holding the stock at a point near the engagement of the buckling means with the stock, such holding means preventing any portion of the stock from moving save the buckled portion, a separator located intermediate the buckling means and the holding means and designed to contact with the buckled portion of the stock while the buckling and holding means are in engagement therewith, and means for successively disengaging the buckling means and holding means from the stock, any buckled portion of the stock other than the topmost sheet being allowed to resume its previous position on the pile after the buckling means is disengaged from the latter and before the holding means is disengaged.

3. In a sheet feed or separator, in combination, a rotary buckler for successively and progressingly combing a buckle in one or a plurality of sheets at the top of a pile of stock, means for engaging and holding the stock at a point near the engagement of the combing buckler with the stock, such holding means preventing any portion of the stock from moving save the buckled portions, a separator, intermediate the combing buckler and the holding means, designed to contact with the buckled portion of the stock while the combing buckler and holding means are in engagement therewith, and means for disengaging the combing buckler from the stock.

4. In a sheet feed or separator, in combination, a rotary buckler for successively and progressingly combing a buckle in one or a plurality of sheets at the top of a pile of stock, means for engaging and holding the stock at a point near the engagement of the combing buckler with the stock, such holding means preventing any portion of the stock from moving save the buckled portions, a separator, intermediate the combing buckler and the holding means, designed to contact with the buckled portion of the stock while the combing buckler and holding means are in engagement therewith, and means for successively disengaging the combing buckler and the holding means from the stock.

5. In a sheet feed or separator, in combination, means for buckling one or a plurality of sheets at the top of a pile of stock, means for engaging and firmly holding the stock at a point near the engagement of the buckling means with the stock, such holding means preventing any portion of the stock from moving save the buckled portion, a separator located intermediate the buckling means and the holding means and designed to be lowered into contact with the buckled portion of the stock while the buckling and holding means are in engagement therewith, and means for raising such buckling means and holding means from engagement with the stock, the buckling means being disengaged therefrom before the holding means to allow any buckled portion of the stock other than the top-most sheet to resume its previous position on the pile.

6. In a sheet feed or separator, in combination, means for buckling one or a plurality of sheets at the top of a pile of stock, means for engaging and firmly holding the stock at a point near the engagement of the buckling means with the stock, such holding means preventing any portion of the stock from moving save the buckled portion, a separator located intermediate the buckling means and the holding means and designed to be lowered into contact with the buckled portion of the stock while the buckling and holding means are in engagement therewith, and means for raising such buckling means, holding means and separator from engagement with the stock, the buckling means being disengaged therefrom before the suction separator or holding means is raised to allow any buckled portion of the stock other than the topmost sheet to resume its previous position on the pile.

7. In a sheet feed or separator, in combination, a rotary combing buckler for buckling one or a plurality of sheets at the top of a pile of stock, such buckler being designed to engage the pile in proximity to two edges thereof and operable in a fixed plane when in engagement with the pile, a presser foot for bearing on and holding the stock at a point near the engagement of the buckler, such presser foot preventing any portion of the stock from moving save the buckled portion, a separator located intermediate the buckler and the presser foot and designed to contact with the buckled portion of the stock while the buckler and presser foot are in engagement therewith, and means for raising such buckler and foot from engagement with the stock, the buckler being disengaged therefrom before the foot to allow any buckled portion of the stock other than the top-most sheet to resume its previous position on the pile.

8. In a sheet feed or separator, in combination, a rotary combing buckler for buckling one or a plurality of sheets at the top of a pile of stock, such buckler being designed to engage the pile in proximity to two edges thereof and operable in a fixed plane when in engagement with the pile, a presser foot for bearing on and holding the stock at a point near the engagement of the buckler, such presser foot preventing any portion of the stock from moving save the buckled portion, a separator located intermediate the buckler and the presser foot and designed to be lowered into contact with the buckled portion of the stock while the buckler and presser foot are in engagement therewith, and means for raising such buckler, foot and separator from engagement with the stock, the buckler being disengaged therefrom before the separator or foot is raised to allow any buckled portion of the stock other than the topmost sheet to resume its previous position on the pile.

9. In a sheet feed or separator, in combination, means for buckling one or a plurality of sheets at the top of a pile of stock, means for engaging and holding the stock at a point near the point of engagement of the buckling means with the stock, such holding means preventing any portion of the stock from moving save the buckled portion, a separator located intermediate the buckling means and the holding means and designed to contact with the buckled portion of the stock while the buckling and holding means are in engagement therewith, such separator being constructed and arranged to engage the buckled portion of the stock and crowd it laterally to concentrate or increase the separation, at the crest of the buckled portion, between the pile and the top-most sheet, and means for raising such buckling means and holding means from engagement with the stock, the buckling means being disengaged therefrom before the holding means to allow any buckled portion of the stock other than the top-most sheet to resume its previous position on the pile.

10. In a sheet feed or separator, in combination, means for buckling one or a plurality of sheets at the top of a pile of stock, means for engaging and holding the stock at a point near the point of engagement of the buckling means with the stock, such holding means preventing any portion of the stock from moving save the buckled portion, a separator located intermediate the buckling means and the holding means and designed to be lowered into contact with the buckled portion of the stock while the buckling and holding means are in engagement therewith, such separator being constructed and arranged to engage the buckled portion of the stock and crowd it laterally to concentrate or increase the separation, at the crest of the buckled portion, between the pile and the topmost sheet, and means for raising such buckling means, holding means and separator from engagement with the stock, the buckling means being disengaged therefrom before the separator or holding means is raised to allow any buckled portion of the stock other than the topmost sheet to resume its previous position on the pile.

11. In a sheet feed or separator, in combination, rotary combing bucklers for buckling one or a plurality of sheets at the top of a pile of stock, such bucklers being designed to engage the pile in proximity to two edges thereof and operable in a fixed plane when in engagement with the pile, presser feet for bearing on and holding the stock at points near the points of engagement of the bucklers, such presser feet preventing any portion of the stock from moving save the buckled portion, separators located intermediate the bucklers and the presser feet and designed to be lowered into contact with the buckled portion of the stock while the bucklers and presser feet are in engagement therewith, such separators being constructed and arranged to engage the buckled portion of the stock and crowd it laterally to increase the separation, at the crest of the buckled portion, between the pile and the topmost sheet, and means for raising such bucklers, feet and separators from engagement with the stock, the bucklers being disengaged therefrom before the separators or feet are raised to allow any buckled portion of the stock other than the topmost sheet to resume its previous position on the pile.

12. In a sheet feed or separator, in combination, means for buckling one or a plurality of sheets at the top of a pile of stock, such buckling being inwardly from the side of a pile at one corner thereof, means for engaging and holding the stock at a point near such corner, a separator located between the holding means and the adjacent corner of the pile and designed to contact with the buckled portion of the stock, such separator being constructed to crowd the buckled portion laterally to increase, at the crest of the buckled portion, the space between the pile and the top-most sheet, and means for raising such holding means.

13. In a sheet feed or separator, in combination, means for buckling one or a plurality of sheets at the top of a pile of stock, such buckling being inwardly from the side of a pile at one corner thereof, means for engaging and holding the stock at a point near such corner, a separator located between the holding means and the adjacent corner of the pile and designed to be lowered into contact with the buckled portion of the stock, such separator being constructed to crowd the buckled portion laterally to increase, at the crest of the buckled portion, the space between the pile and the topmost sheet, and means for raising such separator and holding means.

14. In a sheet feed or separator, in combination, a combing buckler designed to rotate in a fixed plane when resting on a pile of stock and by successive and progressing actions thereon to comb a buckle in one or a plurality of sheets away from one edge and toward the center of another edge and without changing the position of the unbuckled portions of such sheets relatively to the pile, said buckler being disengaged from the pile once in each cycle of operation, allowing the buckled portions of the sheets, with the exception of the topmost, to resume their normal positions on the pile, and a separator for engaging and holding the topmost sheet prior to the buckled portions being released by the combing buckler.

15. In a sheet feed or separator, in combination, means for buckling one or a plurality of sheets at the top of a pile of stock, means for engaging and firmly holding the stock at a point near the engagement of the buckling means with the stock, such holding means preventing any portion of the stock from moving save the buckled portion, a separator located intermediate the buckling means and the holding means and designed to be lowered into contact with the buckled portion of the stock while the buckling and holding means are in engagement therewith and constructed to crowd the same laterally to concentrate the separation of the topmost sheet at the crest of the buckled portion, and means for raising such buckling means, holding means and separator from engagement with the stock, the buckling means being disengaged therefrom before the separator or holding means are raised to allow any buckled portion of the stock other than the topmost sheet to resume its previous position on the pile.

16. In a sheet feed or separator, in combination, rotary combing bucklers for buckling one or a plurality of sheets at the top of a pile of stock, such bucklers being designed to engage the pile in proximity to two edges thereof and operable in a fixed plane when in engagement with the pile, presser feet for bearing on and holding the stock at points near the engagement of the bucklers, such presser feet preventing any portion of the stock from moving save the buckled portion, separators located intermediate the bucklers and the presser feet and designed to be lowered into contact with the buckled portion of the stock while the bucklers and presser feet are in engagement therewith and constructed to crowd the same laterally to concentrate the separation of the topmost sheet at the crest of the buckled portion, and means for raising such bucklers, feet and separators from engagement with the stock, the bucklers being disengaged therefrom before the separators or feet are raised to allow any buckled portion of the stock other than the topmost sheet to resume its previous position on the pile.

17. In a sheet feed or separator, in combination, means for buckling one or a plurality of sheets at the top of a pile of stock at or near opposite corners thereof, presser feet, independent of the buckling means, for engaging and holding the pile at points near such corners, suction separators capable of being lowered into engagement with the buckled portions of the stock, transversely of such buckled portions, means for creating suction in such separators after they are lowered into engagement with the buckled portions, means for successively raising the buckling means and presser feet, and means for raising the suction separators independently of the buckling means.

18. In a sheet feed or separator, in combination, means for buckling one or a plurality of sheets at the top of a pile of stock at or near opposite corners thereof, suction separators movable vertically transversely of the buckled portions of the stock with which they are designed to engage, said separators having curved faces against which the stock is designed to conform as such separators are lowered into engagement therewith, suction openings being formed in said curved faces, and presser feet controlled independently of said buckling means for engaging the top of the pile at points near the buckled portions thereof, said buckling means being disengaged from the pile in advance of the suction separators and presser feet.

19. In a sheet feed or separator, in combination, means for buckling one or a plurality of sheets at the top of a pile of stock, presser feet for engaging such pile during the buckling operation, vertically movable separators for engaging the buckled portions of the stock, means for disengaging the buckling means and presser feet, and means for raising said separators from the pile at a variable speed.

20. In a sheet feed or separator, in combination, means for buckling one or a plurality of sheets at the top of a pile of stock, a presser foot for engaging such pile during the buckling operation, a vertically movable separator for engaging the buckled portions of the stock, means for disengaging the buckling means and presser foot, and means for raising said separator from the pile first slowly and then at an accelerated speed.

21. In a sheet feed or separator having, in combination, a presser foot, buckling means, and a separator, means for independently adjusting the relative positions of the presser foot and the buckling means, and means for collectively adjusting such parts longitudinally of the machine without changing their relative positions.

22. In a sheet feed or separator having, in combination, a presser foot, buckling means, and a separator, means for independently adjusting the relative positions of the presser foot and the buckling means, and means for collectively adjusting such parts transversely and longitudinally of the machine without changing their relative positions.

23. In a sheet feed or separator having, in combination, a presser foot, buckling means and a separator, means for independently adjusting the relative positions of the presser foot and the separator, and means for collectively adjusting such parts longitudinally of the machine without changing their relative positions.

24. In a sheet feed or separator having, in combination, a presser foot, buckling means and a separator, means for independently adjusting the relative positions of the presser foot and the separator, and means for collectively adjusting such parts transversely and longitudinally of the machine without changing their relative positions.

25. In a sheet feed or separator having, in combination, a presser foot, buckling means and a separator, means for independently adjusting the relative position of the buckling means and the separator, and means for collectively adjusting such parts longitudinally of the machine without changing their relative positions.

26. In a sheet feed or separator having, in combination, a presser foot, buckling means and a separator, means for independently adjusting the relative positions of the buckling means and the separator, and means for collectively adjusting such parts transversely and longitudinally of the machine without changing their relative positions.

27. In a sheet feed or separator having, in combination, a presser foot, buckling means, and a suction separator, means for independently adjusting the relative positions of the presser foot, the buckling means and separator, and means for collectively adjusting such parts without changing their relative positions.

28. In a sheet feed or separator having, in combination, a presser foot, buckling means, and a suction separator, means for independently adjusting the relative positions of the presser foot, the buckling means and separator, and means for collectively adjusting such parts transversely of the machine without changing their relative positions.

29. In a sheet feed or separator having, in combination, a presser foot, buckling means, and a suction separator, means for independently adjusting the relative positions of the presser foot, the buckling means and separator, and means for collectively adjusting such parts longitudinally of the machine without changing their relative positions.

30. In a sheet feed or separator having, in combination, a presser foot, buckling means, and a suction separator, means for independently adjusting the relative positions of the presser foot, the buckling means and separator, and means for collectively adjusting such parts transversely and longitudinally of the machine without changing their relative positions.

31. In a sheet feed or separator having, in combination, a rotary buckler, a suction separator, a presser foot, and a carrier common to all of said parts, means for adjusting said carrier both transversely and longitudinally of the machine, means for rotating said buckler, means for raising and lowering said suction separator, and means for raising and lowering said presser foot, said actuating means of the buckler, the presser foot, and the suction separator, being movable with said carrier.

32. In a sheet-feed or separator having a support for a pile of stock, a driven shaft extending transversely of and above said support, a cross rod paralleling said shaft, a frame adjustably mounted on said cross rod, a buckler for engaging the top of the pile, means for actuating said buckler, a suction separator designed to engage the buckled portion of a pile of stock, means for actuating said separator, said buckler and said separator being mounted in and carried by said frame, both said actuating means being operated by said shaft, and means for permitting a relative adjustment between the buckler and the separator without interfering with their respective actuating means.

33. In a sheet-feed or separator having a support for a pile of stock, a driven shaft extending transversely of and above said support, a cross rod paralleling said shaft, a frame adjustably mounted on said cross rod, a buckler for engaging the top of the pile, means for actuating said buckler, a suction separator designed to engage the buckled portion of the pile, means for actuating said separator, a presser foot for holding the top of the pile while being buckled, means for actuating said presser foot to remove it from said pile and to replace it thereon beneath the topmost sheet, said buckler, separator and presser foot being mounted in and carried by said frame, all said actuating means being operated by said shaft, and means for permitting a relative adjustment between the buckler and the separator together with the presser foot without interfering with their respective actuating means.

34. In a sheet-feed or separator having a support for a pile of stock, a driven shaft extending transversely of and above said support, a cross rod paralleling said shaft, a frame adjustably mounted on said cross rod, a buckler carried by said frame, a rotary shaft for said buckler having a beveled pinion, a beveled gear wheel mounted loosely on said driven shaft and with which said pinion engages, a clutch rotatable with said driven shaft, means for causing said clutch to effect the intermittent rotation of said beveled gear wheel, and means for raising and lowering said buckler relatively to the top of the pile.

35. In a sheet feed or separator having a support for a pile of stock, a driven shaft extending transversely of and above said support, a cross rod paralleling said shaft, a frame adjustably mounted on said cross rod, a buckler carried by said frame, a separator, a presser foot, said separator and presser foot also being carried by said frame and said separator adjustable relatively to the buckler, a hollow spindle keyed to said shaft and carried by said frame, said spindle being adjustable longitudinally of said shaft, means mounted on the spindle and rotatable therewith for actuating the buckler, and separate means on said spindle for moving the separator and presser foot relatively to the pile of stock.

36. In a sheet-feed or separator having a support for a pile of stock, a driven shaft extending transversely of and above said support, a cross rod paralleling said shaft, a frame adjustably mounted on said cross rod, a buckler carried by said frame, a separator, a presser foot, said separator and presser foot also being carried by said frame and adjustable relatively to each other and to the buckler, a hollow spindle keyed to said shaft and carried by said frame, said spindle being adjustable longitudinally of said shaft, means mounted on the spindle and rotatable therewith for actuating the buckler, separate means on said spindle for moving the separator and presser foot relatively to the pile of stock, and means for permitting the last mentioned means to be adjusted longitudinally of the spindle concurrently with the adjustment of the separator and presser foot in the frame.

37. The combination with a driven shaft and a cross rod paralleling such shaft, of a frame adjustably mounted on said cross rod and composed of end pieces and tie rods, a rotary buckler, a suction separator, and a presser foot, a series of independent levers fulcrumed on one of the tie rods of such frame and connected respectively to the buckler, the separator and the presser foot, and means for raising and lowering said levers.

38. The combination with a driven shaft and a cross rod paralleling such shaft, of a frame adjustably mounted on said cross rod and composed of end pieces and tie rods, a rotary buckler, a suction separator, and a presser foot, a series of independent levers fulcrumed on one of the tie rods of such frame and connected respectively to the buckler, the separator and the presser foot, cams on said shaft for raising said levers, and springs for effecting the lowering of said levers.

39. The combination with a driven shaft and a cross rod paralleling such shaft, of a frame adjustably mounted on said cross rod and composed of end pieces and tie rods, a rotary buckler, a suction separator, and a presser foot, a series of independent levers fulcrumed on one of the tie rods of such frame and connected respectively to the buckler, the separator and the presser foot, a hollow spindle keyed on said shaft and mounted in said end pieces, and a series of cams adjustable on said spindle for actuating said levers.

40. The combination with a driven shaft and a cross rod paralleling such shaft, of a frame adjustably mounted on said cross rod and composed of end pieces and tie rods, a rotary buckler, a suction separator, and a presser foot, a series of independent levers fulcrumed on one of the tie rods of such frame and connected respectively to the buckler, the separator and the presser foot, a hollow spindle keyed on said shaft and mounted in said end pieces, a series of cams adjustable on said spindle for actuating said levers in one direction, and springs connected to said levers for moving them in the opposite direction.

41. The combination with a driven shaft and a cross rod paralleling such shaft, of a frame adjustably mounted on said cross rod and composed of end pieces and tie rods, a spindle adjustably keyed on said shaft and mounted at its ends in said end pieces, a rotary buckler, means actuated by said shaft for rotating said buckler, a lever connected to said buckler, a suction separator, a lever therefor, a presser foot, a lever therefor, each of said levers being fulcrumed on said frame, and a series of cams for operating said levers, said cams being adjustably secured on said spindle.

42. The combination with a driven shaft and a cross rod paralleling such shaft, of a frame adjustably mounted on said cross rod and composed of end pieces and tie rods, a spindle adjustably keyed on said shaft and mounted at its ends in said end pieces, a rotary buckler, means actuated by said shaft for rotating said buckler, a lever connected to said buckler, a suction separator, a lever therefor, a presser foot, a lever therefor, each of said levers being fulcrumed on one of said tie rods, certain of said levers being slidably mounted on said tie rod, and a series of cams for operating said levers, said cams being adjustably secured on said spindle.

43. In a sheet-feed or separator having a support for a pile of stock and means for separating the sheets thereof, suction carriers located above the pile, vertically-movable brackets having horizontal guides, slides fitted in said guides and to which said carriers are connected, a cross-shaft having cams for raising said brackets, links connecting said slides to said cams, teeth carried by said cross-shaft, a swinging arm having a toothed sector engaging the teeth of said cross-shaft, and a constantly-rotating cam for reciprocating said arm.

44. In a sheet-feed or separator having a support for a pile of stock and means for separating the sheets thereof, suction carriers located above the pile, a support for said carriers comprising a cross-shaft extended transversely of the machine, means actuated by said shaft for moving said carriers vertically and horizontally, movable frames supporting said cross-shaft at the sides of the machine, and means for simultaneously adjusting both frames horizontally of the machine.

45. In a sheet-feed or separator having a support for a pile of stock and means for separating the sheets thereof, suction carriers located above the pile, a support for said carriers comprising a cross-shaft extended transversely of the machine, means actuated by said shaft for moving said carriers vertically and horizontally, movable frames supporting said cross-shaft, rack-rods at the sides of the machine upon which said frames are movable back and forth, a rod extended centrally through said cross-shaft having toothed portions engaging said rack-rods, and means carried by one of said frames for actuating said cross-shaft to operate the carrier-moving means.

46. In a sheet feed or separator, in combination, means for producing a series of traveling arcs or buckles in the top-most sheet or sheets of a pile of stock, and means for holding the stock against movement in proximity to the buckling means and thereby accumulating such series in a larger arc or buckle.

47. In a sheet feed or separator, in combination, a plurality of combing members adapted to act successively upon the topmost sheet or sheets of a pile of stock, and means for resisting the movement of the stock produced by the action of said members, said parts coöperating to produce a continually increasing buckle.

48. In a sheet feed or separator, in combination, means for holding the sheets in a pile, means for imparting a plurality of successive buckling impulses to a sheet or sheets in each cycle of operation of the machine, said buckling means being arranged for temporarily holding and accumulating the buckles so produced, and means for engaging and removing the top-most sheet after it is buckled.

49. In a sheet feed or separator, in combination, means for producing a series of successive buckles in the top-most sheet or sheets of a pile of stock, means for temporarily holding and accumulating said series to produce an increased buckle at a given point, and means for engaging the top-most sheet at the buckled portion and removing it from the pile.

50. In a sheet feed or separator, in combination, means for holding the sheets of a pile of stock at a given point, and means for subjecting the upper sheet or sheets to a series of successive rubs in the direction of the holding means to buckle the stock with a minimum relative sliding movement of the sheets on each other.

51. In a sheet feed or separator, in combination, a rotary buckling member constructed to comb the sheets of a pile of stock by the application of a series of successive impulses thereto, means for holding the stock against movement beyond the point where the buckle is to be formed, and a separator between the buckling member and holding means adapted to separate the top-most sheet from the pile.

52. In a sheet feed or separator, in combination, a rotary buckling member constructed to comb the sheets of a pile of stock by the application of a series of successive impulses thereto, means for holding the stock against movement beyond the point where the buckle is to be formed, and a suction separator between the buckling member and holding means having movement to crowd the stock laterally toward said member and also to separate the top-most sheet from the pile.

In testimony whereof, I have signed this specification in the presence of two subscribing witnesses.

CHARLES G. HARRIS.

Witnesses:
   FRANCIS S. MAGUIRE,
   JOHN A. MURPHY.